(12) United States Patent
Schmidgall

(10) Patent No.: US 8,500,383 B2
(45) Date of Patent: Aug. 6, 2013

(54) TRAILER AND UNLOADING DEVICE

(76) Inventor: Hartzell H. Schmidgall, Mediapolis, IA (US)

(*) Notice: Subject to any disclaimer, the term of this patent is extended or adjusted under 35 U.S.C. 154(b) by 0 days.

(21) Appl. No.: 13/197,087

(22) Filed: Aug. 3, 2011

(65) Prior Publication Data
US 2012/0034056 A1 Feb. 9, 2012

Related U.S. Application Data

(60) Provisional application No. 61/370,240, filed on Aug. 3, 2010.

(51) Int. Cl.
B65G 67/24 (2006.01)
B60P 1/44 (2006.01)

(52) U.S. Cl.
USPC ........ 414/509; 414/525.1; 414/911; 414/538; 410/30

(58) Field of Classification Search
USPC ............ 104/50; 193/32, 40; 198/314, 464.3, 198/468.6, 718, 726, 728, 746, 772, 777, 198/779; 414/24.5, 252, 253, 259, 276, 277, 414/294, 342, 345, 376, 390, 400, 429, 433, 414/458, 491, 509–516, 548, 595, 661, 680, 414/746.2–746.8
See application file for complete search history.

(56) References Cited

U.S. PATENT DOCUMENTS

| | | | | |
|---|---|---|---|---|
| 1,567,473 A * | 12/1925 | Starr | | 198/746 |
| 2,279,340 A * | 4/1942 | Postlewaite | | 118/108 |
| 2,408,862 A | 10/1946 | Lisota | | |
| 2,710,104 A * | 6/1955 | Putnam | | 414/198 |
| 2,776,762 A | 1/1957 | Schmidgall | | |
| 3,042,231 A | 7/1962 | Cyphert | | |
| 3,072,980 A * | 1/1963 | Ewing | | 164/298 |
| 3,219,206 A * | 11/1965 | Cocker, III | | 242/559.3 |
| 3,419,159 A * | 12/1968 | Schaller et al. | | 414/746.3 |
| 3,486,609 A * | 12/1969 | Rogers | | 198/772 |
| 3,620,348 A * | 11/1971 | Kursinczky | | 198/464.3 |
| 3,667,620 A | 6/1972 | Steiro | | |
| 3,779,696 A * | 12/1973 | Poore et al. | | 432/6 |
| 3,858,731 A | 1/1975 | Briggs | | |
| 4,289,443 A * | 9/1981 | Jacob | | 414/746.2 |
| 5,249,905 A | 10/1993 | Warner et al. | | |
| 5,358,371 A | 10/1994 | Neddo | | |
| 5,397,210 A | 3/1995 | O'Neill | | |
| 6,505,713 B1 | 1/2003 | Paul et al. | | |

FOREIGN PATENT DOCUMENTS

JP 61012531 A * 1/1986
JP 10181833 A * 7/1998

* cited by examiner

Primary Examiner — Gregory Adams
(74) Attorney, Agent, or Firm — Hamilton IP Law, PC; Jay R. Hamilton; Charles A. Damschen

(57) ABSTRACT

In one embodiment of a trailer and/or unloading device, a front and rear roller assembly and chock may be moved along the length of the trailer. The front and rear roller assemblies may each include two rollers that may be actuated between a first and second position. The chock may include a stop that may be actuated between a first and second position. The arrangement of front and rear rollers and chock allows the operator to unload a plurality of objects placed on the trailer deck, one object at a time, while remaining in the cab of a prime mover. The moving components of the trailer and/or unloading device may be powered hydraulically. The trailer and/or unloading device may include strategically placed cameras and a control panel for operating the various elements of the trailer and unloading device placed in the cab of the prime mover.

5 Claims, 24 Drawing Sheets

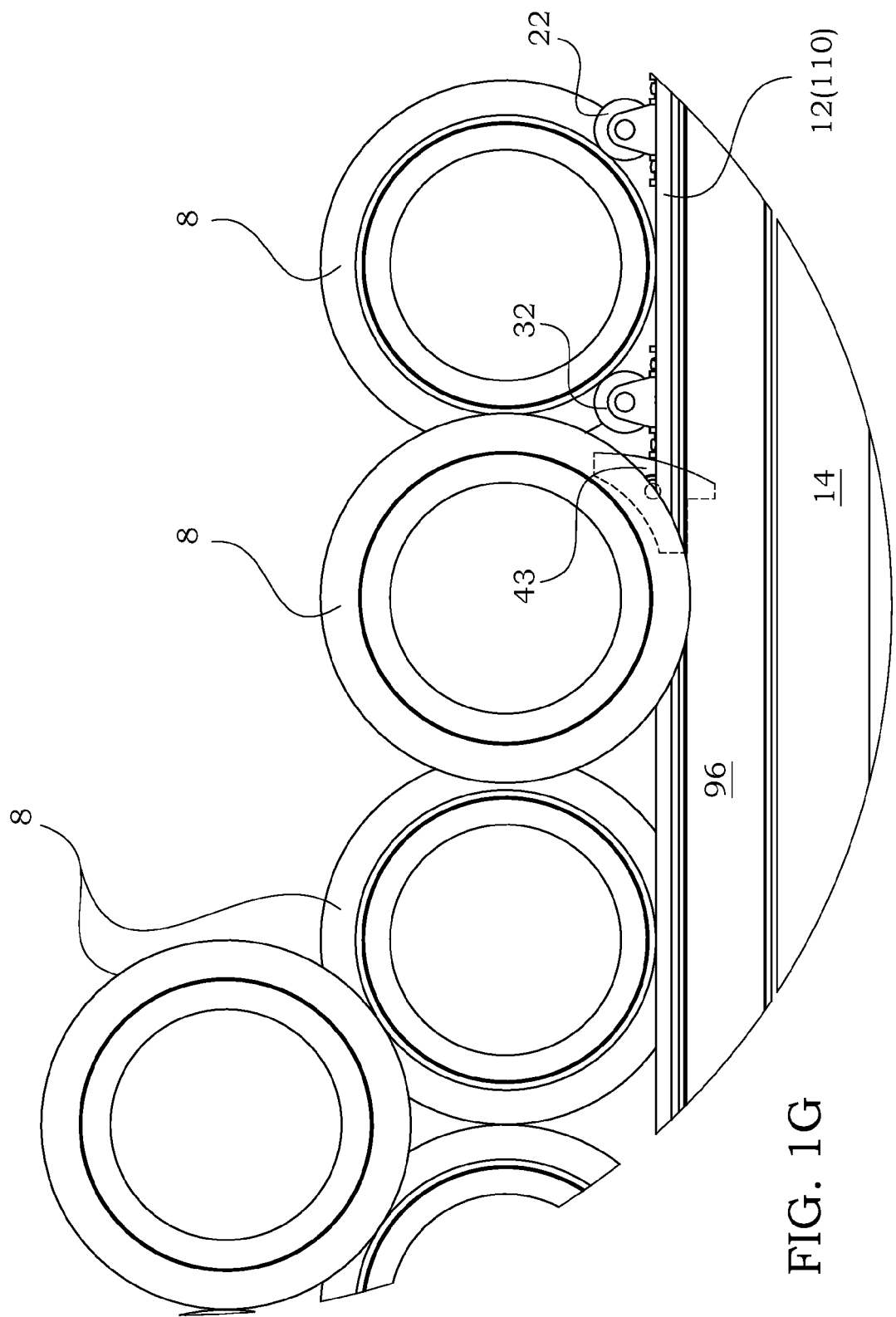

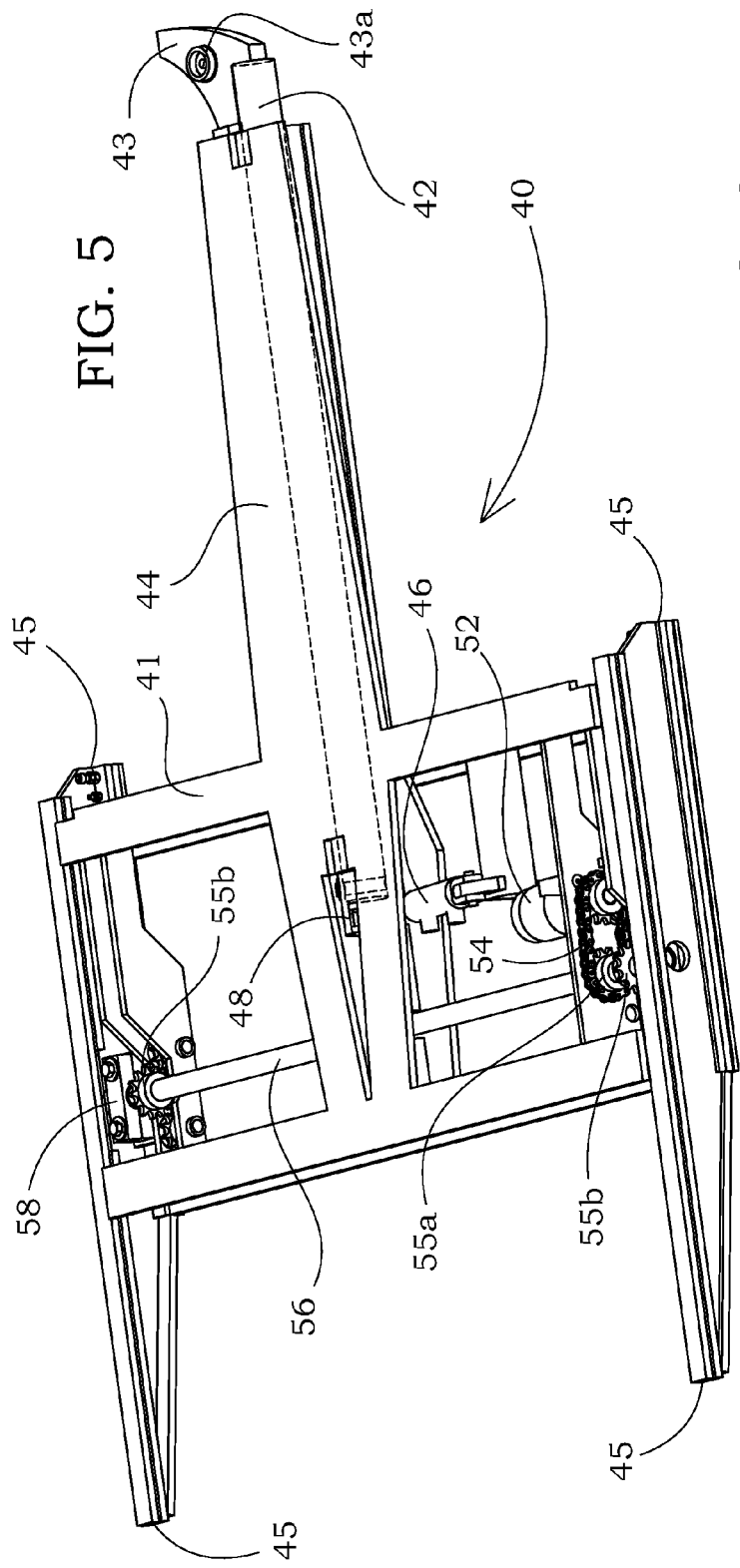

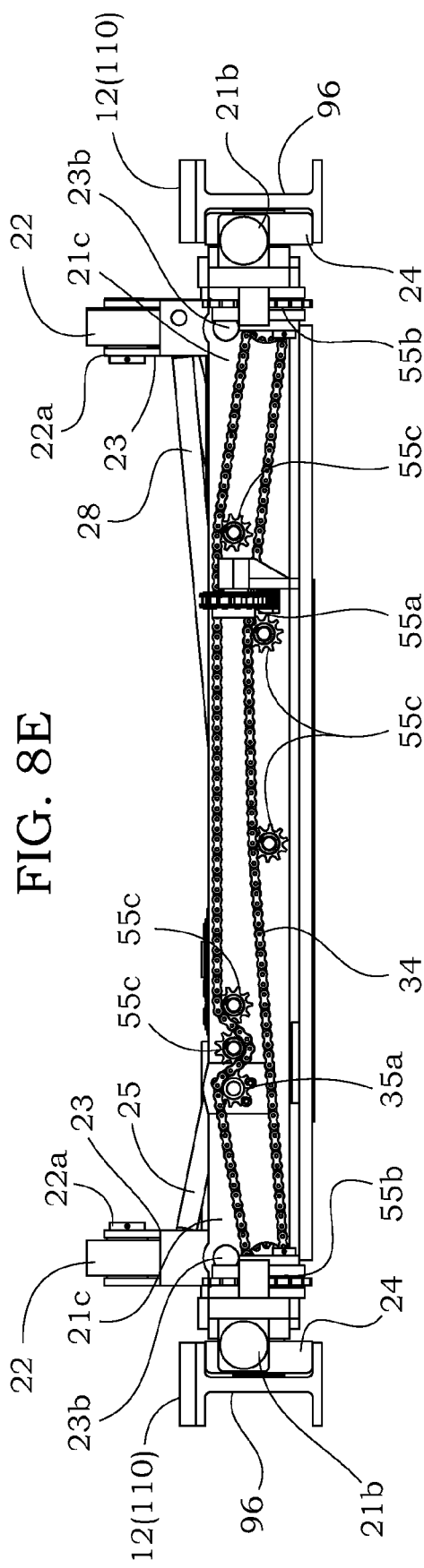
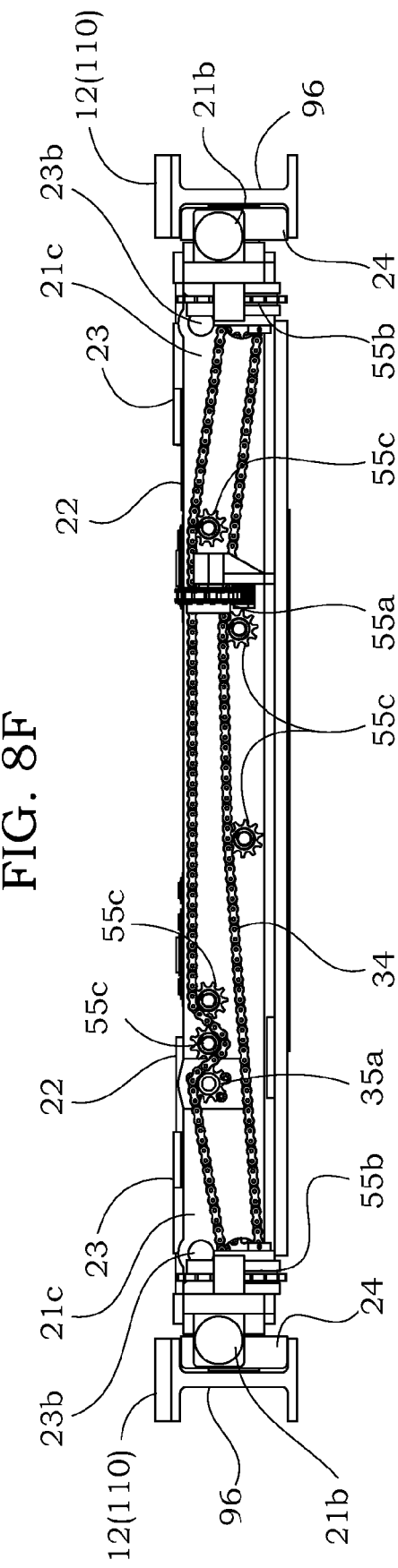

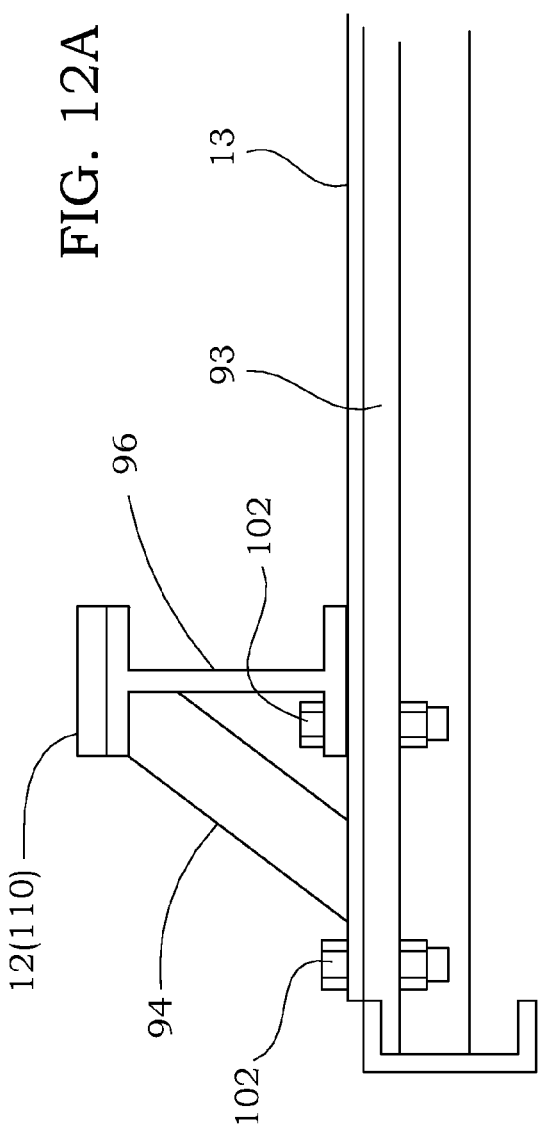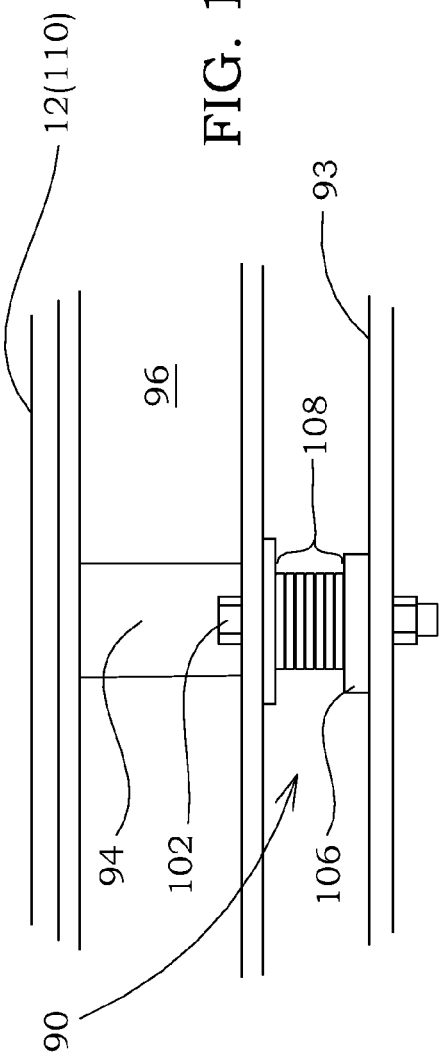

TRAILER AND UNLOADING DEVICE

CROSS REFERENCE TO RELATED APPLICATIONS

Applicant claims priority from provisional U.S. Pat. App. No. 61/370,240 filed on Aug. 3, 2010, which is incorporated by reference herein in its entirety.

FIELD OF INVENTION

The present invention relates to a trailer for hauling generally cylindrical objects, and more specifically, to a trailer and/or unloading device that allow for the fully robotic unloading of transported objects.

STATEMENT REGARDING FEDERALLY SPONSORED RESEARCH OR DEVELOPMENT

No federal funds were used to develop or create the invention disclosed and described in the patent application.

REFERENCE TO SEQUENCE LISTING, A TABLE, OR A COMPUTER PROGRAM LISTING COMPACT DISK APPENDIX

Not Applicable

BACKGROUND

Vigorous and hazardous manual labor is required to maneuver pipe sections or other generally cylindrical object to an unload position near the end of a trailer. Pipe sections, typically constructed of concrete and having a diameter up to twenty four inches, are commonly stacked in two horizontal rows with one on top of the other. One trailer-load of twelve-inch diameter pipe could consist of fifty pipe sections.

To move a pipe section from the top row to the surface of the trailer (i.e., the "deck"), the operator currently uses a bar to roll the rear pipe section from under the upper pipe section. As the upper pipe section nears the deck it will drop rapidly and could be damaged if the rear pipe section is not properly restrained. The operator must then re-block the pipe sections remaining on the trailer before rolling the removed pipe section the length of the trailer to an unload position at the rear end of the trailer.

Most trailers are arranged so that the deck slopes approximately six inches front to rear. Depending on the grade of the terrain, the operator may be required to restrain or push the pipe sections. Using a bar to move a large pipe section up a grade for any length is physically taxing, potentially dangerous, and time consuming. Restraining a pipe section from traversing down a grade requires the operator to place himself in front of the pipe section to hold or block it, which places the operator in a highly dangerous situation.

Once the pipe section is unloaded from the trailer and resting on the ground, the operator must position blocks adjacent that pipe section to prevent the next unloaded pipe section from colliding with that pipe section and causing damage. When done correctly, the operator places blocks after a pipe section is unloaded. However, many pipe sections are constructed with a bell on one end. This causes the pipe section to roll in an arc on the ground rather than in a straight line, which makes it difficult to judge where the next pipe section will contact the pipe sections already placed on the ground. Such difficulty gives rise to a very hazardous practice of the operator placing himself in the path of a rolling pipe section to place the block just before the point of impact with any pipe section already placed on the ground.

After the pipe section is unloaded, the operator walks from the area on the ground where he was blocking the pipe section and toward the trailer to unload the next pipe section. Many times this distance is fifty feet or more. Furthermore, after unloading two to five pipe sections, the operator must return to the cab of the truck and pull the trailer forward to allow room for more pipe sections. Improper blocking of pipe sections or entirely neglecting to block a pipe section has been a source of many accidents. Pipe sections freely traversing down a grade creates a very dangerous situation.

BRIEF SUMMARY OF THE ILLUSTRATIVE EMBODIMENT

The trailer and/or unloading device rolls individual pipe sections from the load of pipe sections positioned on the deck of the trailer to an unloader at the rear of the trailer. The unloader lowers the semi-fragile pipe section to the ground. These types of unloaders are generally described in U.S. Pat. No. 2,776,762, which is incorporated by reference herein in its entirety. The various elements of the trailer and/or unloading device may be integrally manufactured with a trailer specifically designed for the purposes as disclosed herein, or the operative elements of the trailer and/or unloading device may be retrofit to existing flatbed trailers One embodiment of the trailer and/or unloading device uses a chock capable of actuating between a first position (in which first position the chock does not prevent the pipe section from rolling toward the rear of the trailer) and a second position (in which second position the chock functions to secure the position of a pipe section on the deck of the trailer and prevents it from rolling toward the rear of the trailer).

Front and rear roller assemblies may be configured to roll a pipe section from a group of pipe sections on the trailer deck along the length of the trailer and/or unloading device to the unloader at the rear of the trailer and/or unloading device. In one embodiment of the trailer and/or unloading device, the roller assemblies may be adjusted for pipe sections from 12 inches through 72 inches in outside diameter and a weight of up to 11,000 pounds. Other embodiments may be configured to adjust for different sizes of pipe sections having different weights (e.g., greater than 72 inches in outside diameter and weights more than 11,000 pounds). The chock, roller assemblies, and other elements of the trailer and/or unloading device may be driven hydraulically with a gasoline- or diesel-powered hydraulic unit as part of the trailer and/or unloading device, they may be electrically driven, or they may be driven by other powering structures and/or methods.

Various elements of the trailer and/or unloading device, such as the chock and roller assemblies, may be controlled through a control panel positioned in the cab of the prime mover. This remote control of certain elements of the trailer and/or unloading device removes the operator from direct interaction with a pipe section and thus increases the safety of the operator during unloading. Cameras and video displays such as those used as rear view cameras for automobiles, harvesting machines, and/or mobile homes may be used to allow the operator to monitor the chock and roller assembly operation as well as the area behind the unloader.

Allowing the operator to unload an entire trailer-full of pipe sections while the operator remains in the cab of the prime mover eliminates multiple safety problems and decreases the unloading time enormously. Smaller pipe sections may traverse the length of the trailer at speeds up to five miles per hour. The operator may allow large pipe sections to traverse the length of the trailer at very low speeds. Because the operator need not exit the cab of the prime mover vehicle during unloading, the operator may easily pull the trailer ahead for each pipe section, which entirely eliminates the need for blocking (as previously described to prevent collision damage to the pipe sections on the ground). It is estimated that this trailer and/or unloading device will reduce unloading time by more than 50% and cut pipe section breakage drastically, which will result in lower labor, material, and equipment costs for the industry.

BRIEF DESCRIPTION OF THE FIGURES

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limited of its scope, the invention will be described and explained with additional specificity and detail through the use of the accompanying drawings.

FIG. 1G provides a side view of a first embodiment of the trailer and/or unloading device with front and rear roller assemblies engaged with a first object, wherein the third adjacent object from FIG. 1F is now in the same row as the first object, and wherein the third object is restrained by the chock.

FIG. 5 is a perspective view of the embodiment of the chock shown in FIG. 4 wherein the stop is folded down.

FIG. 6 is a side view of one embodiment of a drive mechanism that may be used to power the chock and/or roller assembly along the trailer and/or unloading device.

FIG. 8E is an end view of the embodiment of a rear roller assembly shown in FIG. 8A positioned in I-beam rails, wherein the rear rollers are extended up.

FIG. 8F is an end view of the embodiment of a rear roller assembly shown in FIG. 8A positioned in I-beam rails, wherein the rear rollers are folded down.

FIG. 12A is an end view of one embodiment of the trailer and/or unloading device I-beam rails and a portion of the anchor system for use therewith.

FIG. 12B is a detailed side view of one embodiment of the anchoring system that may be used with the trailer and/or unloading device.

DETAILED DESCRIPTION - LISTING OF ELEMENTS

Figure 1A:
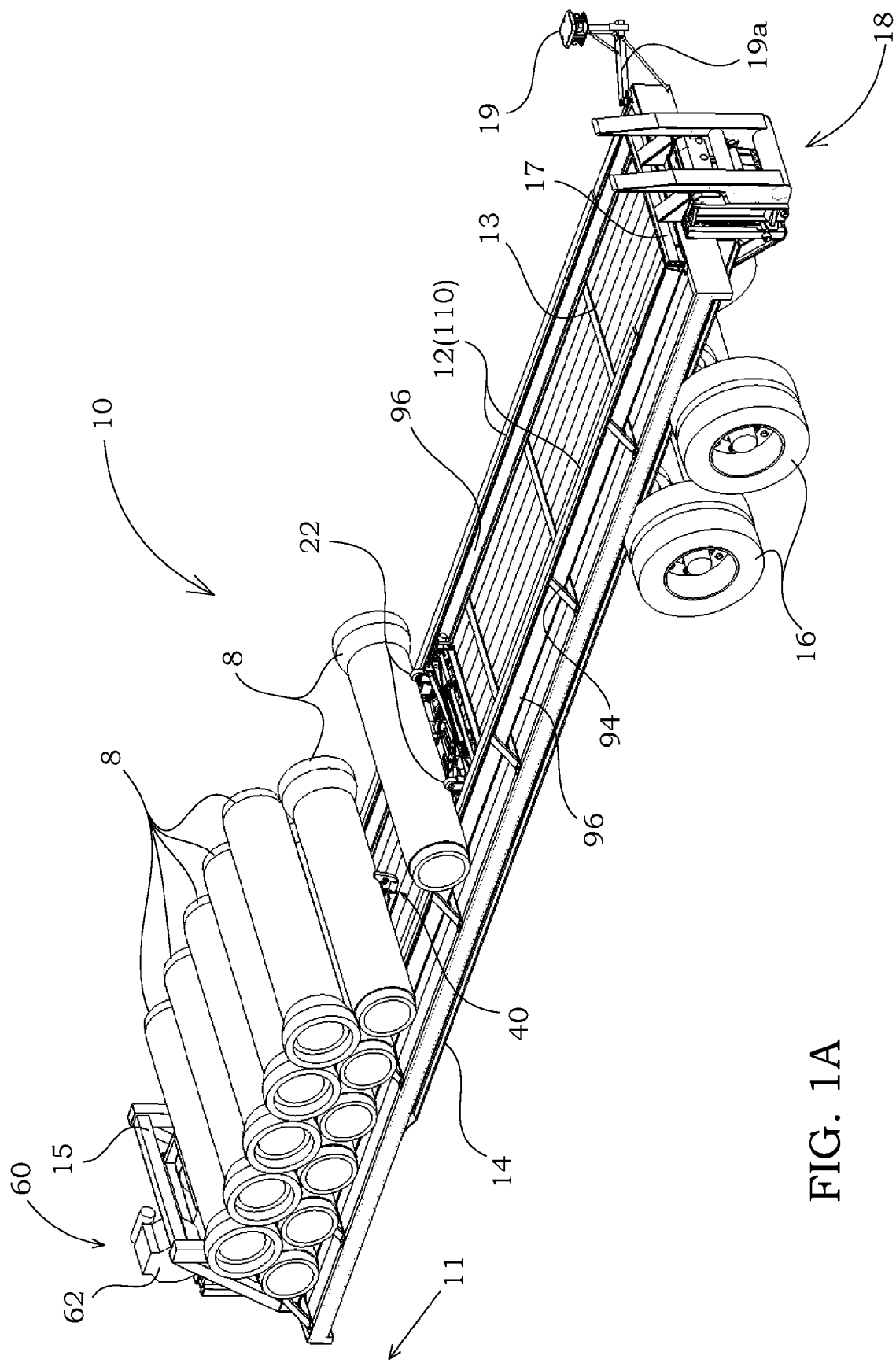
FIG. 1A provides a perspective view of a first embodiment of the trailer and/or unloading device with one object in an intermediate position engaged with front and rear roller assemblies, wherein the next object for unloading is restrained by the chock.

| ELEMENT DESCRIPTION | ELEMENT # |
|---|---|
| Pipe section | 8 |
| Trailer (unloading device) | 10 |
| Prime mover | 11 |
| Trailer deck | 12 |
| Lateral support | 13 |
| Trailer frame support | 14 |
| Front load stop | 15 |
| Trailer wheel | 16 |
| Cross bar | 17 |
| Unloader | 18 |
| Camera | 19 |
| Arm | 19a |
| Rear roller assembly | 20 |
| Rear roller assembly frame | 21 |
| Extension bar | 21a |
| Stop tab | 21b |
| Keeper bracket | 21c |
| Debris bar | 21d |
| Rear roller | 22 |
| Roller bearing (front or rear) | 22a |
| Roller keeper (front or rear) | 23 |
| Pin receiver | 23a |
| Keeper pin | 23b |
| Position wheel | 24 |
| Connector | 25 |
| Actuator | 26 |
| Rear pivot arm | 27 |
| Rear pivot arm connection | 27a |
| Long connector | 28 |
| Screw | 29 |
| Screw gear | 29a |
| Front roller assembly | 30 |
| Front roller assembly frame | 31 |
| Extension bar receiver | 31a |
| Chock recess | 31b |
| Front roller | 32 |
| Cushion | 33 |
| Chain | 34 |
| Chain motor | 35 |
| Motor gear | 35a |
| Front pivot arm | 37 |
| Front pivot arm connection | 37a |
| Slide bar | 38 |
| Slide bar guide | 38a |
| Slot | 38b |
| Nut box | 39 |
| Chock | 40 |
| Chock frame | 41 |
| Pipe engager | 42 |
| Stop | 43 |
| Chock camera | 43a |
| Chock cantilever | 44 |
| Absorber | 45 |
| Chock actuator | 46 |
| Pipe engager positioner | 48 |
| Drive mechanism | 50 |
| Motor | 52 |
| Fixed chain | 53 |
| Roller chain | 54 |
| Receiver sprocket | 55a |
| Powered sprocket | 55b |
| Idler sprocket | 55c |
| Jack shaft | 56 |
| Jack shaft keeper | 58 |
| Hydraulic power system | 60 |
| Pump unit | 62 |
| Cable | 64 |
| Frame cable interface | 65 |
| Hydraulic reel | 66 |
| Moveable pulley | 67 |
| Dual pulley | 67a |
| Cable interface | 67b |
| Electric reel | 68 |
| Control panel | 70 |
| Video display | 71 |
| Joystick | 72 |

-continued
DETAILED DESCRIPTION - LISTING OF ELEMENTS

| ELEMENT DESCRIPTION | ELEMENT # |
|---|---|
| First joystick switch | 72a |
| Second joystick switch | 72b |
| Expand button | 73a |
| Retract button | 73b |
| Chock-lower button | 74 |
| Chock-position lock | 75 |
| Chock-down indicator | 76a |
| Chock-up indicator | 76b |
| Front-roller-up indicator | 77 |
| Chock-peak-pressure indicator | 78a |
| Roller-assembly-peak-pressure indicator | 78b |
| Main auto stop indicator | 79 |
| Roller assembly auto stop indicator | 79a |
| Anchor system | 90 |
| Trailer camber | 92 |
| Existing flatbed surface | 93 |
| Outrigger | 94 |
| I-beam rail | 96 |
| I-beam rail ramp | 96a |
| Bolt | 102 |
| Bearing plate | 106 |
| Washer | 108 |
| Pipe rest | 110 |

DETAILED DESCRIPTION

1. Description of Illustrative Embodiment

Before the various embodiments of the present invention are explained in detail, it is to be understood that the invention is not limited in its application to the details of construction and the arrangements of components set forth in the following description or illustrated in the drawings. The invention is capable of other embodiments and of being practiced or of being carried out in various ways. Also, it is to be understood that phraseology and terminology used herein with reference to device or element orientation (such as, for example, terms like "front", "back", "up", "down", "top", "bottom", and the like) are only used to simplify description of the present invention, and do not alone indicate or imply that the device or element referred to must have a particular orientation. In addition, terms such as "first", "second", and "third" are used herein and in the appended claims for purposes of description and are not intended to indicate or imply relative importance or significance. As used herein, the terms "trailer," "unloading device," and "trailer and/or unloading device" may be used interchangeably depending upon whether the text refers to a trailer that has been originally outfitted with an unloading device, a conventional trailer that has been retrofitted with the unloading device, or the unloading device alone prior to engagement thereof with a trailer. The direction referred to as "toward the front of the trailer or unloading device" is generally the portion to the upper left of the drawing in FIGS. 1A-1D and 3A, the left in FIGS. 1E-2A and 3; the direction referred to as "toward the rear of the trailer or unloading device" is generally the portion to the lower right or right of those drawings, respectively.

Referring now to the drawings, wherein like reference numerals designate identical or corresponding parts throughout the several views, FIG. 1A provides a perspective view of one embodiment of the trailer and/or unloading device 10 with a plurality of pipe sections 8 loaded thereof, wherein one pipe section 8 is separated from the remainder thereof. Generally, the embodiments of the trailer and/or unloading device 10 disclosed and described herein are for use with transporting and unloading generally cylindrical objects, such as pipe sections 8. However, the trailer and/or unloading device 10 may be configured for use with other shaped objects, and therefore the illustrative examples of the trailer and/or unloading device 10 are in no way limiting to their scope. Accordingly, an infinite number of configurations for the trailer and/or unloading device 10 exist, and the optimal configuration will vary based on several factors, including but not limited to the objects for which the trailer and/or unloading device 10 are designed to transport and unload. The specific length of the trailer and/or unloading device 10 is in no way limiting to their scope, but it is contemplated that the illustrative embodiment of the trailer 10 as pictured herein will be between forty two and forty eight feet in length. Furthermore, some embodiments of the trailer and/or unloading device disclosed herein are specifically designed to be towed behind a prime move (not show specifically herein, but the position of which is generally indicated by reference numeral 11). The prime mover 11 may be a truck, tractor, or any other suitable machine.

The unloading device 10 as disclosed herein may be configured to be installed on a conventional flat bed trailer, such as a drop deck trailer, double drop deck trailer, or other various thereof. Accordingly, a trailer 10 as disclosed and claimed herein may be manufactured by retrofitting a conventional flatbed trailer with an unloading device 10. It is contemplated that most embodiments of the unloading device 10 will be most easily engaged with conventional flat bed trailers with a spacing of fifty eight inches between the centers of the two I-beam rails 96, which are described in detail below, wherein the I-beam rails 96 are six inches in height.

The illustrative embodiment of the trailer and/or unloading device 10 pictured herein uses a trailer frame having two parallel I-beam rails 96 running along a portion of the length of the trailer and/or unloading device 10. A more detailed, end view of one embodiment of the I-beams 96 and their respective orientation on the illustrative embodiment of the trailer and/or unloading device 10 is shown in FIG. 8, and is described in further detail below. The top surfaces of the I-beams 96 form trailer deck 12 onto which the load (e.g., pipe sections 8 in the pictured example, wherein the deck 12 is formed as a pipe rest 110) is placed. In embodiments of the trailer and/or unloading device in which an existing trailer is retrofitted with the appropriate components, the I-beam rails 96 may be affixed to an existing flatbed surface 93, which is further described below. It is contemplated that the pipe rest 110 will be constructed of a material that allows as little slippage as possible between the objects to be carried and the pipe rest 110. For pipe sections 8, it is contemplated that those constructed of concrete will properly interact with a pipe rest 110 constructed of wood, other cellulosic materials, certain synthetic materials, and/or combinations thereof.

The trailer deck 12 may be constructed of any material that is suitable for the specific application for which the trailer and/or unloading device 10 is designed, including but not limited to metal and metallic alloys, cellulosic material, polymers, and/or combinations thereof. It is contemplated that in the illustrative embodiment of the trailer and/or unloading device 10, wherein the deck 12 is formed as a pipe rest 110, the material on the top surface of the I-beam rails 96 will be wood or a composite material that minimizes movement of the pipe sections 8 during transport and use.

The I-beam rails 96 may be supported by a trailer frame support 14 to which a plurality of trailer wheels 16 may be rotatably attached in a conventional method. Outriggers 94 may be affixed to the I-beam rails 96 and trailer frame support 14 to further stabilize and strengthen the I-beam rails 96. Additionally, a plurality of lateral supports 13 may be positioned between the I-beam rails 96 for additional structural integrity. It is contemplated that one embodiment of the trailer and/or unloading device will utilize ⅜-inch thick steel or aluminum lateral supports 13. At least the weight of the cargo and side sway forces during transit will determine the specific spacing and width of the lateral supports 13. A front load stop 15 may be positioned at the front end of the I-beam rails 96 and trailer frame support 14 to protect various elements of the trailer and/or unloading device 10 from damage during use, which is described in detail below. The front load stop 15 may also be configured to add structural integrity to the I-beam rails 96 and/or trailer frame support 14.

Figure 2:
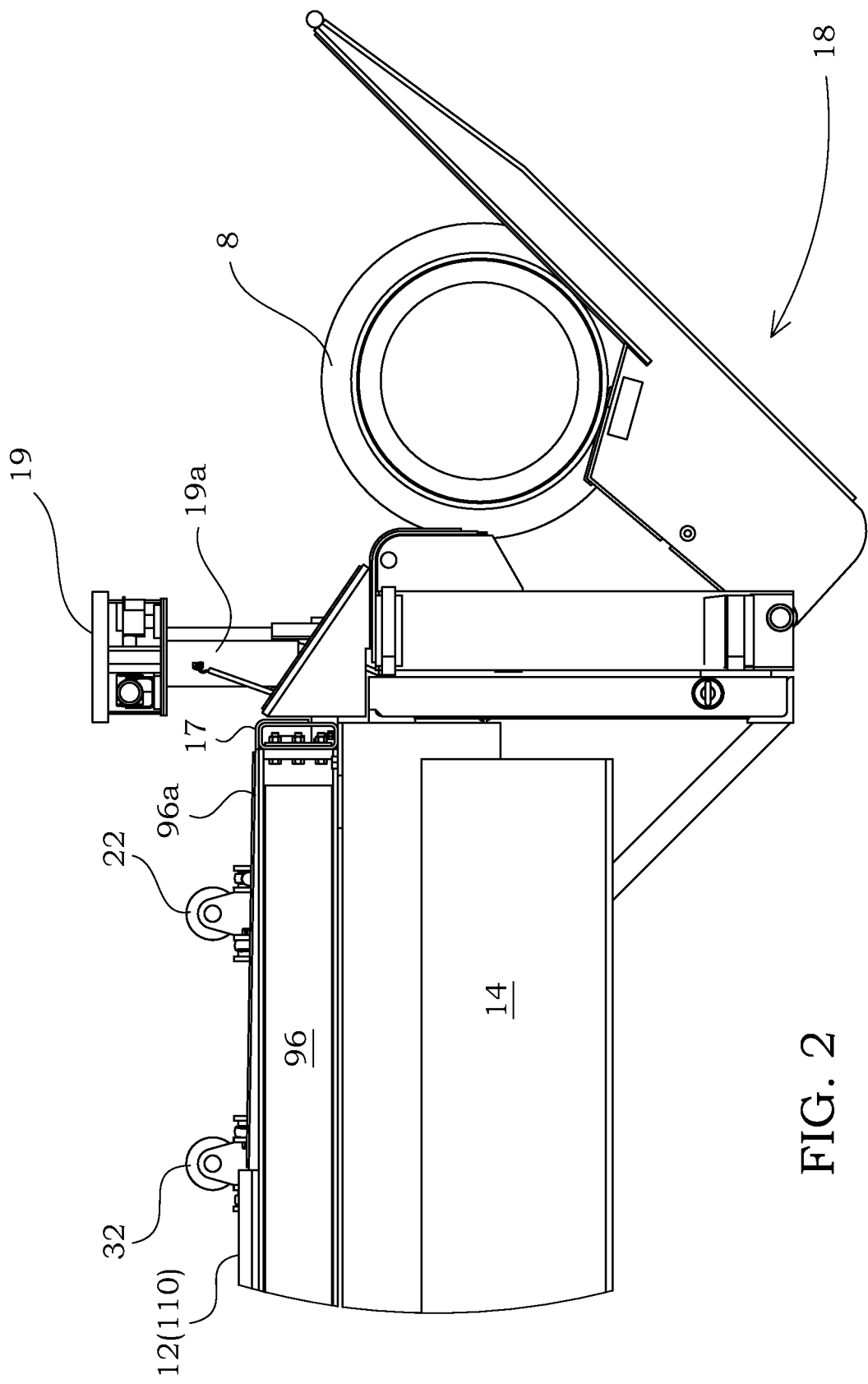
FIG. 2 is a depiction of a first point in time using a method of unloading objects according to one embodiment of the trailer and/or unloading device.

At least one cross bar 17 may be affixed to each I-beam rail 96 and positioned there between. FIG. 2 shows a cross bar 17 positioned at the rear terminals of the I-beam rails 96 and attached thereto via a plurality of bolts. Cross bars 17 may serve to increase the overall structural integrity of the trailer and/or unloading device 10. Additionally, a cross bar 17 located at the rear terminals of the two I-beam rails 96 may serve as a final stop for the rear roller assembly 20 (and consequently set the limit for rearward travel of the front roller assembly 30 and chock 40, as described in detail below). Absorbers 45 may be affixed to the cross bar 17, which may be used alone or in combination with stop tabs 21*b* positioned on the rear roller assembly 20, to minimize the force that the rear roller assembly 20 imparts to the I-beam rails 96 when the rear roller assembly 20 reaches the rear end of the trailer and/or unloading device 10.

It is contemplated that the cross bar 17 at the rear terminals of the I-beam rails 96 should be easily attached and detached from the trailer and/or unloading device 10. This will allow relatively easy removal of the roller assemblies 20, 30 and/or chock 40 for maintenance or replacement. The cross bar 17 at the rear terminals of the I-beam rails 96 may be structurally enhanced using shear bracing and other supports.

In another embodiment of the trailer and/or unloading device 10, a hydraulic reservoir may serve as a front load stop 15. In such an embodiment, the front load stop 15 may also be a structural member/support for the trailer frame support 14 and/or I-beam rails 96. It is contemplated that in such an embodiment the front load stop 15 will be constructed of tubing with the goal of providing maximum cooling for any hydraulic fluid circulated through the tubing. The more heat that may be removed from the hydraulic fluid while it is located in the tubing, the less hydraulic fluid the trailer and/or unloading device 10 will require to properly function. It is contemplated that sight glasses and/or level gauges in combination with temperature sensors and displays may be used to monitor the hydraulic fluid.

In other embodiments of the trailer and/or unloading device 10 the I-beam rails 96 are configured so that a trailer frame support 14 is not required. The trailer frame support 14 and trailer wheels 16 are not described further herein for purposes of clarity, and because their specific configuration will vary according to parameters of the trailer and/or unloading device 10 (including but not limited to maximum weight, objects to be hauled, etc.) that are in no way limiting to the scope of the trailer and/or unloading device 10.

Front and rear roller assemblies 30, 20, respectively and a chock 40 may be configured such that each may move along the length of the I-beam rails 96 in a generally horizontal plane, which is described in detail below. The chock 40 is generally placed toward the front of the trailer and/or unloading device 10 with respect to the front and rear roller assemblies 30, 20. Both the chock 40 and the roller assemblies 20, 30 may be engaged with the I-beam rails 96 so that they move laterally within the inside channel of the I-beam rails 96 as shown for the rear roller assembly 20 in FIGS. 8E & 8F.

Figure 3:
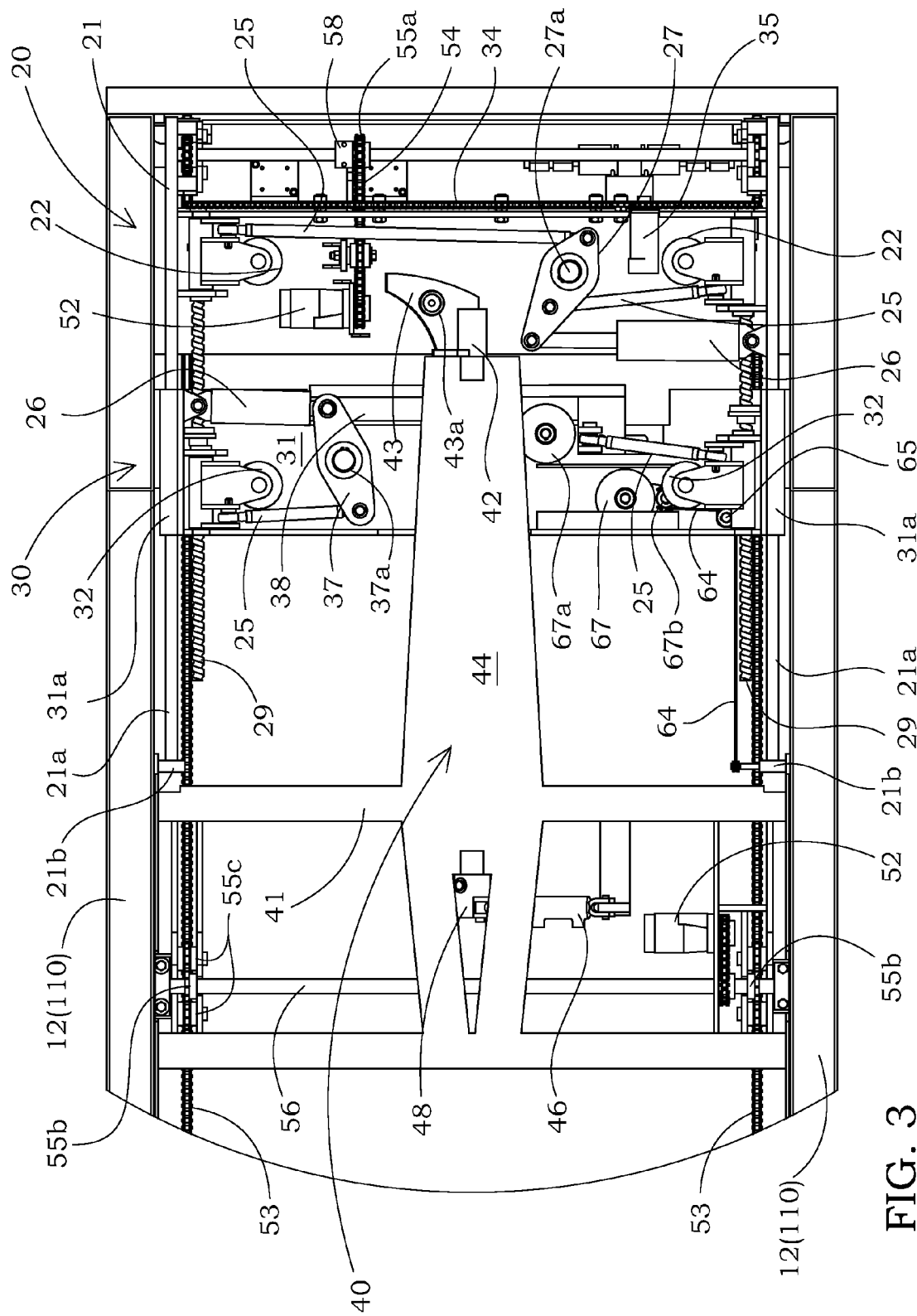
FIG. 3 is a detailed top view of the chock positioned adjacent the roller assembly and near the rear end of the trailer in one illustrative embodiment of the trailer and/or unloading device.
Figure 3A:
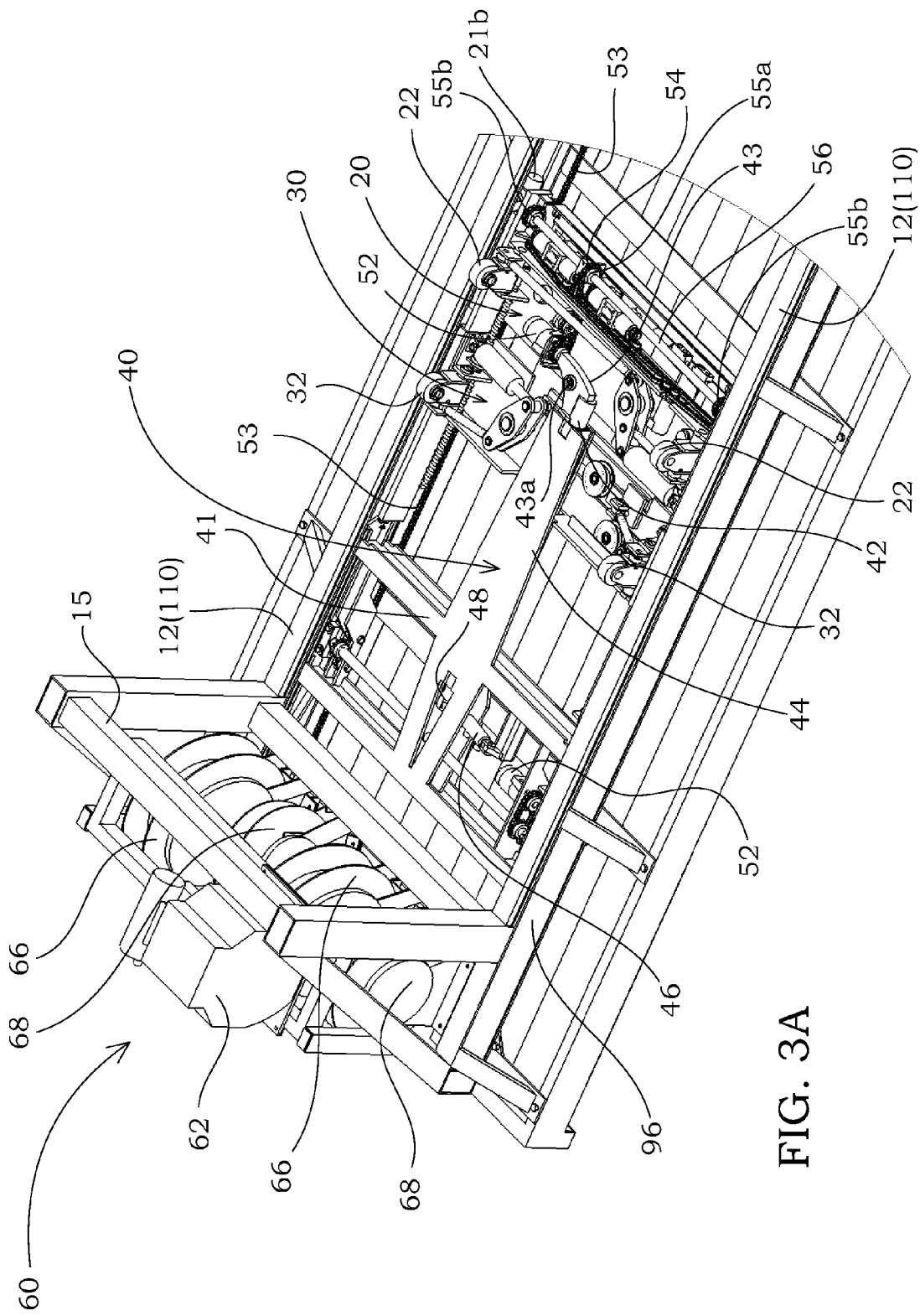
FIG. 3A is a detailed perspective view of the chock positioned adjacent the roller assembly and near the front end of the trailer in one illustrative embodiment of the trailer and/or unloading device.

One embodiment of a front and rear roller assembly 30, 20, and chock 40, with the front roller assembly 30 adjacent a chock 40, is shown from an elevated view in FIG. 3 (wherein the front of the trailer and/or unloading device 10 is oriented in the direction toward the left of FIG. 3) and from a perspective view in FIG. 3A. The rear roller assembly 20 is positioned toward the right of the drawing from the vantage depicted in FIG. 3. This embodiment of the rear roller assembly 20 includes a rear roller assembly frame 21, which generally supports the various elements of the rear roller assembly 20.

Figure 7:
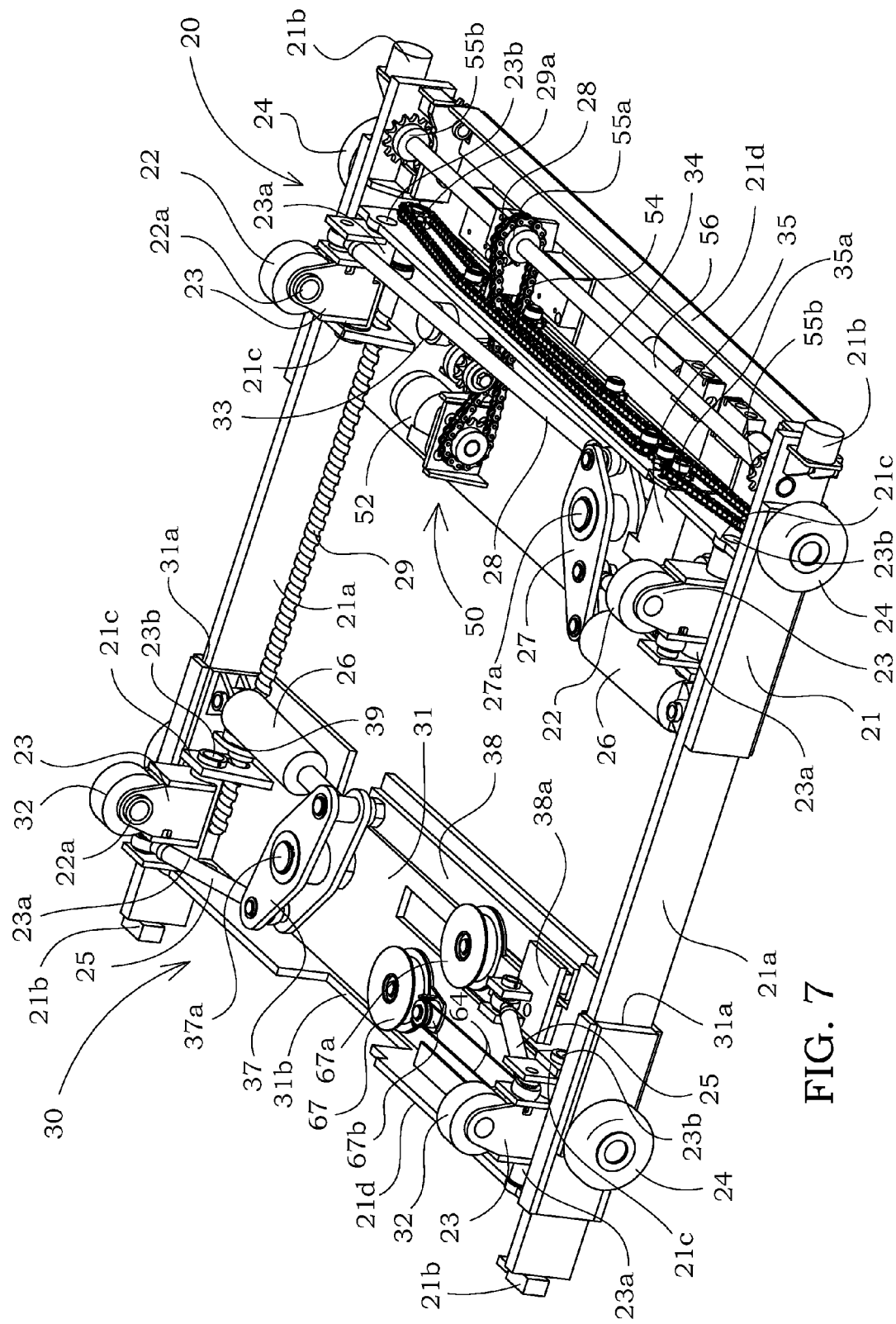
FIG. 7 is a perspective view of one embodiment of a front and rear roller assembly, wherein the front and rear roller assemblies are separated by the maximum distance allowed in that particular embodiment.

Two position wheels 24 are rotatably affixed to either side of the rear roller assembly frame 21 and two position wheels 24 are rotatably affixed to either side of the front roller assembly frame 31, as best shown in FIG. 7 (which provides a perspective view of the front and rear roller assemblies 30, 20). Referring now generally to FIGS. 7-8F, which provide various detailed views of the front and/or rear roller assemblies 30, 20, one position wheel 24 of the rear roller assembly 21 and one position wheel 24 of the front roller assembly 31 may ride within the inside recess of either I-beam rail 96 as depicted for the rear roller assembly 20 in FIGS. 8E & 8F.

Accordingly, both the front and rear roller assemblies 30, 20 may move horizontally with respect to the I-beam rails 96 aided by the rotation of the position wheels 24. Stop tabs 21b may also be fashioned in the rear roller assembly frame 21 to protect other components of the rear roller assembly 20 during contact with the cross bar 17. A debris bar 21d may be secured to the rear-most edge of the rear roller assembly frame 21 and to the front-most edge of the front roller assembly frame 31. The debris bar 21d serves to protect the components of each roller assembly 20, 30 from damage during use. The status of each debris bar 21d may be monitored to detect situations that may be damaging to any component of either the roller assembly 20, 30.

The position wheels 24 may be sized to allow just enough clearance between the inner portions of the I-beam rails 96 so that the position wheels 24 do not bind when the roller assemblies 20, move along the length of the I-beam rails 96. The position wheels 24 may be pivotally mounted to the roller assemblies 20, 30 using any suitable structure and/or method. It is contemplated that some embodiments of the trailer and/or unloading device will employ flanged bearings that provide a bearing surface between the outside of the position wheel 24 and the vertical portion of the I-beam rails 96. In some embodiments of the trailer and/or unloading device 10 the position wheels 24 are configured to withstand loads of up to 6,000 pounds each. However, the specific load-carrying capabilities of the position wheels 24 in no way limit the scope of the trailer and/or unloading device 10 as disclosed and claimed herein.

Two roller keepers 23 are pivotally mounted to the rear roller assembly frame 21 (and/or front roller assembly frame 31), and one rear roller 22 (or front roller 32) is rotatably affixed to each roller keeper 23, as best shown in FIG. 7. Low-profile bearing axles may be used in the roller bearing 22a to rotatably secure each roller 22, 32 to each roller keeper 23. The roller keepers 23 are mounted to the roller assembly frames 21, 32 such that the roller keepers 23 may be pivotally actuated between a first a second position. In the first position (as shown for the rear rollers 22 in FIGS. 1C, 3, and 8 and for the front rollers 32 in FIGS. 1C, 3, and 8), the roller keepers 23 are folded down. In the first position, the axis of each rear roller 22 is generally vertically oriented and such that neither the rear rollers 22 nor roller keepers 23 extend above the pipe rest 110 (best shown in FIG. 8F). In the second position (as shown for the rear rollers 22 in FIGS. 1A, 1B, 1D-1G, 2, 2A, 3A, 7, and 8B-8E and as shown for the front rollers 32 in FIGS. 1A-C, 1E-1G, 2, 2A, 3A, 7, 8B, and 8C) the roller keepers 23 are extended upward. In this position the axis of each roller 22, 32 is generally horizontally oriented and such that the rollers 22, 32 and the roller keepers 23 extend above the pipe rest 110, as best depicted for the rear rollers 22 in FIG. 8E. It is contemplated that for most embodiments of the trailer and/or unloading device 10 the axes of all the front and rear rollers 32, 22 will reside within the same plane when in the second position. Accordingly, the front rollers 32 are located precisely within the shadow of the rear rollers 22 for the embodiment shown in FIG. 8E.

The distance to which the rollers 22, 32 rise above the I-beam rails 96 will vary from one embodiment of the trailer and/or unloading device 10 to the next without limitation. For the illustrative embodiment of the trailer and/or unloading device 10, it is contemplated that configuring the rollers 22, 32 and roller keepers 23 so that the rollers 22, 32 extend five and one-half inches above the I-beam rails 96 (with four inch diameter rollers 22, 32 approximately two inches wide) will optimize the cost/benefit ratio for the trailer and/or unloading device 10. The rollers 22, 32 may be constructed of any suitable material, including but not limited to steel, aluminum, other metals and/or metal alloys, cellulosic materials, synthetic materials, and/or combinations thereof. The roller bearings 23a may be any suitable bearing without limitation. It is contemplated that for several applications of the trailer and/or unloading device 10, the roller bearings 23a will be configured as flanged poly-lube bearings designed to last the lifetime of the trailer and/or unloading device 10.

The roller keepers 23 may be constructed of any suitable material, including but not limited to steel, aluminum, other metals and/or metal alloys, cellulosic materials, synthetic materials, and/or combinations thereof. The illustrative embodiment of the trailer and/or unloading device 10 uses roller keepers constructed of ⅜-inch thick steel plates, wherein a roller 22, 32 is positioned between two such plates. The roller keepers 23 may be pivotally secured to the roller frame assemblies 21, 31 using any suitable structure and/or method. In the pictured embodiment, the portion of the roller keeper 23 situated below the roller bearing 22a is outfitted with a pin receiver 23a that is between two keeper brackets 21c in the roller assembly frame 21, 31 (best shown in FIG. 7). A keeper pin 23b passes through both keeper brackets 21c and the pin receiver 23a. The keeper pin 23b may include one or more bearing surfaces on the relevant portions thereof, which may be configured as a poly-lube flanged bearing.

Both the front and rear roller assemblies 30, 20 in the illustrative embodiment of the trailer and/or unloading device 10 have a low-profile design, as indicated in FIGS. 8E & 8F. This allows the roller assemblies 30, 20 to move horizontally along the length of the I-beam rails 96 without contacting anything positioned above or below the I-beam rails 96. Additionally, the chock 40 cantilevers over the roller assemblies 20, 30 (as described in detail below), which requires a low-profile design, and may require a chock recess 31b formed in the front roller assembly frame 31, as shown in FIG. 7. It is contemplated that the base of each roller assembly frame 20, 30 may be constructed of ½-inch thick steel plates, but other materials and/or dimensions may be used without limitation.

An actuator 26 may be used to pivot the roller keepers 23 from the first position to the second position and vice versa. In the illustrative embodiment the actuator 26 is hydraulically powered, but any actuator 26 may be used with the trailer and/or unloading device 10 without departing from the spirit and scope thereof, including but not limited to pneumatic, electric, or other actuators 26. Accordingly, the specific type of actuator 26 is in no way limiting to the scope of the trailer and/or unloading device 10. Alternatively, other structures and/or methods may be employed to move the roller keepers 23 between the first and second position and vice versa. Consequently, the specific structure and/or method used to move the roller keepers 23 between the first and second position in no way limits the scope of the trailer and/or unloading device 10 as disclosed and claimed herein. The illustrative embodiment of the trailer and/or unloading device 10 utilizes a hydraulic actuator 26 with an operating pressure of up to 2500 pounds per square inch (psi).

In the rear roller assembly 21, an actuator 26 may be pivotally affixed to the rear roller assembly frame 21 at one end of the actuator 26. The opposite end of the actuator 26 may be pivotally affixed to one end of a rear pivot arm 27, as best shown in FIG. 8. The rear pivot arm 27 may be pivotally affixed to the rear roller assembly frame 21 at a rear pivot arm connection 27a, which in the illustrative embodiment is offset from the center of the rear pivot arm 27. One end of a connector 25 may be pivotally connected to the end of the rear pivot arm 27 adjacent to the joint of the rear pivot arm 27 and the actuator 26. The opposite end of this connector 25 may be pivotally connected to the left roller keeper 23 (as viewed from the vantage shown in FIG. 8). The end of the rear pivot arm 27 opposite the actuator 26 may be pivotally connected to one end of a long connector 28, and the opposite end of the long connector 28 may be pivotally connected to the right roller keeper 23 (as viewed from the vantage shown in FIG. 8). It is contemplated that the connection points in the roller keepers 23 for the connector 25 and long connector 28, respectively, may be integrated into the respective roller keepers 23. However, in other embodiments those connections points may be formed separately without limitation.

The ends of the connector 25 and long connector 28 may be configured to provide the appropriate capacity for the particular application of the trailer and/or unloading device 10. It is contemplated that many embodiments will suffice with ends having a capacity of 23,200 pounds each. Additionally, it is contemplated that the ends of the connector 25 and long connector 28 may be configured as male threaded ends to engage specific terminal connectors pivotally engaged with the roller keepers 23.

As the actuator 26 pivotally affixed to the rear roller assembly frame 21 is extended, the rear pivot arm 27 rotates in a clockwise direction about the rear pivot arm connection 27a as viewed from the vantage shown in FIG. 8. Consequently, the connector 25 pivotally affixed to the rear pivot arm 27 and the left roller keeper 23 moves to the right, which causes the top roller keeper to pivot about the rear roller assembly frame 21 in a downward direction. Simultaneously, this rotation of the rear pivot arm 27 causes the long connector 28 to move in a leftward direction, which causes the right roller keeper 23 to pivot about the rear roller assembly frame 21 in a downward direction (i.e., the first position as defined above). Conversely, as that actuator 26 is contracted, the rear pivot arm 27 rotates in a counterclockwise direction about the rear pivot arm connection 27a, which causes the roller keepers 23 on the rear roller assembly 20 to rise upward due to the interaction between the actuator 26, connector 25, rear pivot arm 27, and long connector 28 (i.e., the second position as defined above). Accordingly, the two roller keepers 23 on the rear roller assembly 20 are yoked to one another so that both roller keepers 23 thereon are in the same relative position and operate in unison.

The front roller assembly 30 in the illustrative embodiment is generally similar to the rear roller assembly 20 in the operation and configuration of the two roller keepers 23 and the front rollers 32 rotatably attached thereto. The two roller keepers 23 of the front roller assembly are pivotally attached to the front roller assembly frame 31. The roller keepers 23 of the front roller assembly 30 and the front rollers 32 may be actuated between a first and second position as previously described for the rear roller assembly 20.

As with the rear roller assembly 20, in the front roller assembly 30 an actuator 26 may be used to pivot the roller keepers 23 from the first position to the second position and vice versa. In the illustrative embodiment the actuator 26 is hydraulically powered, but any actuator 26 may be used with the trailer and/or unloading device 10 without departing from the spirit and scope thereof, including but not limited to pneumatic, electric, or other actuators 26. Accordingly, the specific type of actuator 26 is in no way limiting to the scope of the trailer and/or unloading device 10.

In the front roller assembly 31, an actuator 26 may be pivotally affixed to the front roller assembly frame 31 at one end of the actuator 26. The opposite end of the actuator 26 may be pivotally affixed to one end of a front pivot arm 37, as shown in FIG. 8. The front pivot arm 37 may be pivotally affixed to the front roller assembly frame 31 at a front pivot arm connection 37a, which in the illustrative embodiment is generally near the center of the front pivot arm 37. The end of the front pivot arm 37 opposite the actuator 26 may be pivotally connected to one end of a connector 25, and the opposite end of the connector 25 may be pivotally connected to a roller keeper 23, as shown in FIG. 8 and previously described for the rear roller assembly 20.

One end of a slide bar 38 may also be pivotally connected to the end of the actuator 26 pivotally connected to the front pivot arm 27. The slide bar 38 in the illustrative embodiment extends across a portion of the trailer and/or unloading device 10 under the chock 40 (described in detail below) and is pivotally connected to one end of a second connector 25 at the end of the slide bar 38 opposite the front pivot arm 37, as best shown in FIG. 7. The opposite end of the second connector 25 may be pivotally attached to the roller keeper 23 opposite other roller keeper 23 engaged with the front roller assembly frame 31 (i.e., the roller keeper 23 positioned to the left in the vantage shown in FIG. 8).

As the actuator 26 that is pivotally affixed to the front roller assembly frame 31 is extended, the front pivot arm 37 rotates in a clockwise direction about the front pivot arm connection 37a as viewed from the vantage shown in FIG. 8. Consequently, the connector 25 pivotally affixed to the front pivot arm 37 and the right roller keeper 23 moves to the right, which causes the right roller keeper 23 to pivot about the front roller assembly frame 31 in an upward direction (i.e., into the second position). Simultaneously, the extension of the actuator 26 causes the slide bar 38 to move to the left, which causes the left connector 25 to also move to the left. As the top connector 25 (i.e., the connector 25 pivotally affixed to both the left roller keeper 23 and the slide bar 38 in FIG. 8) moves rightward, the left roller keeper 23 pivots about the front roller assembly frame 31 in an upward direction. Conversely, as that actuator 26 is contracted, the front pivot arm 37 rotates in a counterclockwise direction about the front pivot arm connection 37a, which causes the roller keepers 23 on the front roller assembly 30 to fold downward (i.e., into the first position) due to the interaction between the actuator 26, connectors 25, front pivot arm 37, and slide bar 38. Accordingly, the two roller keepers 23 on the front roller assembly 30 are yoked to one another so that both roller keepers 23 thereon are in the same relative position and operate in unison.

Cushions 33 (shown for the rear roller assembly 20 in FIGS. 7 & 8D) may be affixed to either the rear roller assembly frame 20 and/or the front roller assembly frame 30 and/or any of the roller keepers 23. The cushions 33 may be used to protect the roller keepers 23 and/or the rollers 22 during actuation from the second to the first positions thereof. Cushions 33 may also be positioned on the front roller assembly 30 without limitation. Alternatively, the actuators 26 could be configured to provide automatic cushioning at certain points in the operation.

Both the front and rear pivot arm connections 37a, 27a may be constructed through any suitable structure and/or method. In one embodiment a 1.75 inch G-8 bolt is welded to the respective roller assembly frame 20, 30, and the pivot arms 27, 37 are configured with corresponding apertures to accept the bolt, around which the pivot arms 27, 37 may rotate.

In the illustrative embodiment shown herein, both the slide bar 38 and the actuator 26 are pivotally connected to one another at a first end of each, and the actuator 26 is pivotally connected to the front roller assembly frame 31 at its opposite end. Accordingly, a slide bar guide 38a may be used for certain embodiments of the trailer and/or unloading device 10 to ensure that the actuator 26 moves the slide bar 38 in a linear fashion without imparting exacting shearing and/or bending forces on the slide bar 38. The slide bar guide 38a in the illustrative embodiment is rigidly engaged with the end of the slide bar 38 opposite the actuator 26 and pivotally engaged with one roller keeper 23, as best shown in FIG. 7. The slide bar guide 38a engages a slot 38b (best shown in FIG. 8A) formed in the front roller assembly frame 31 and a rearward edge of the front roller assembly frame 31 such that the slide bar 38 may only move in a linear fashion that is parallel to the direction of actuation of the actuator 26. The slide bar guide 38a in the illustrative embodiment may be formed as a pin or stock that is easily retained within the slot 38b.

In other embodiments of the trailer and/or unloading device 10, the slide bar 38 may be configured to pivot about either end. An embodiment of a slide bar guide 38a in such a configuration may include a channel (not shown) secured to the front roller assembly frame 31. A pin (not shown) may be affixed to the slide bar 38 such that the pin fits within the channel to ensure the slide bar's 37 path of travel is parallel to the channel. Other types of slide bar guides 38a may be used without limitation, and an infinite number thereof exist. Accordingly, the specific configuration of the slide bar 38 and/or slide bar guide 38a in no way limits the scope of the trailer and/or unloading device 10.

Although the illustrative embodiment of a front and rear roller assembly 30, 20 as described herein use one actuator 26 to actuate both roller keepers 23 between a first and second position, other configurations may be used with the trailer and/or unloading device 10 without departing from the spirit and scope thereof. For example, in certain embodiments, if more actuators 26 are used, the connector 25, front and rear pivot arms 25, 35, long connector 28, and slide bar 38 may be omitted.

The illustrative embodiment of the trailer and/or unloading device 10 provides the operator with the ability to adjust the distance between the roller assemblies 20, 30. In the illustrative embodiment, this is accomplished through the use of two screws 29 rotatably mounted to the rear roller assembly frame 21 at either side thereof and two corresponding nut boxes 39 fixedly or floatingly mounted to the front roller assembly frame 30 at either side thereof. To change the distance between the roller assemblies 20, 30, the two screws 29 rotate in unison. The threads of the screws 29 engage the threads of the nut boxes 39 so that turning the screws 29 in a first direction causes the nut boxes 39 to move toward the rear roller assembly 20 (to decrease the distance between the roller assemblies 20, 30). Accordingly, turning the screws 29 in a second direction will cause the nut boxes 39 to move away from the rear roller assembly 20 (to increase the distance between the roller assemblies 20, 30). The angle of the threads on the screws 29 will vary from one embodiment to the next. The screws 29 may be powered by a hydraulic motor, or any other source of rotational energy.

In the illustrative embodiment pictured herein, the two screws 29 are coupled to one another via a chain 34 to ensure they operate in unison (i.e., at the same speed and by the same magnitude), as best shown in FIGS. 8E and 8F. In other embodiments, the screws 29 may be made to operate in unison through electronic circuitry not shown herein but well known to those skilled in the art.

The chain 34 is engaged with a motor gear 35a, which is coupled to a chain motor 35. The chain motor 35 provides rotational power to the motor gear 35a, which in turn drives the chain 34. The idler sprockets 55c may be arranged in a manner such that the chain 34 is free from obstruction, as shown in FIGS. 8E and 8F, and also to mitigate chain lash around the motor gear 35a. The chain 34 may also be engaged with two screw gears 29a secured to the end of the screws 29 on the rear roller assembly 20. The chain motor 35 may be any suitable rotational power source, including but not limited to a hydraulic or electrical motor. It is contemplated that using a hydraulic motor will increase packaging efficiency as other components of the trailer and/or unloading device may use hydraulic power.

In another embodiment not pictured herein, main actuators (not shown) may be coupled at a first end to the front roller assembly 30 and at a second end to the rear roller assembly 20 such that the actuation of the main actuator adjusts the distance between the front and rear roller assemblies 30, 20. Such an embodiment would not require screws 29 or nut boxes 39 to function.

Figure 8A:
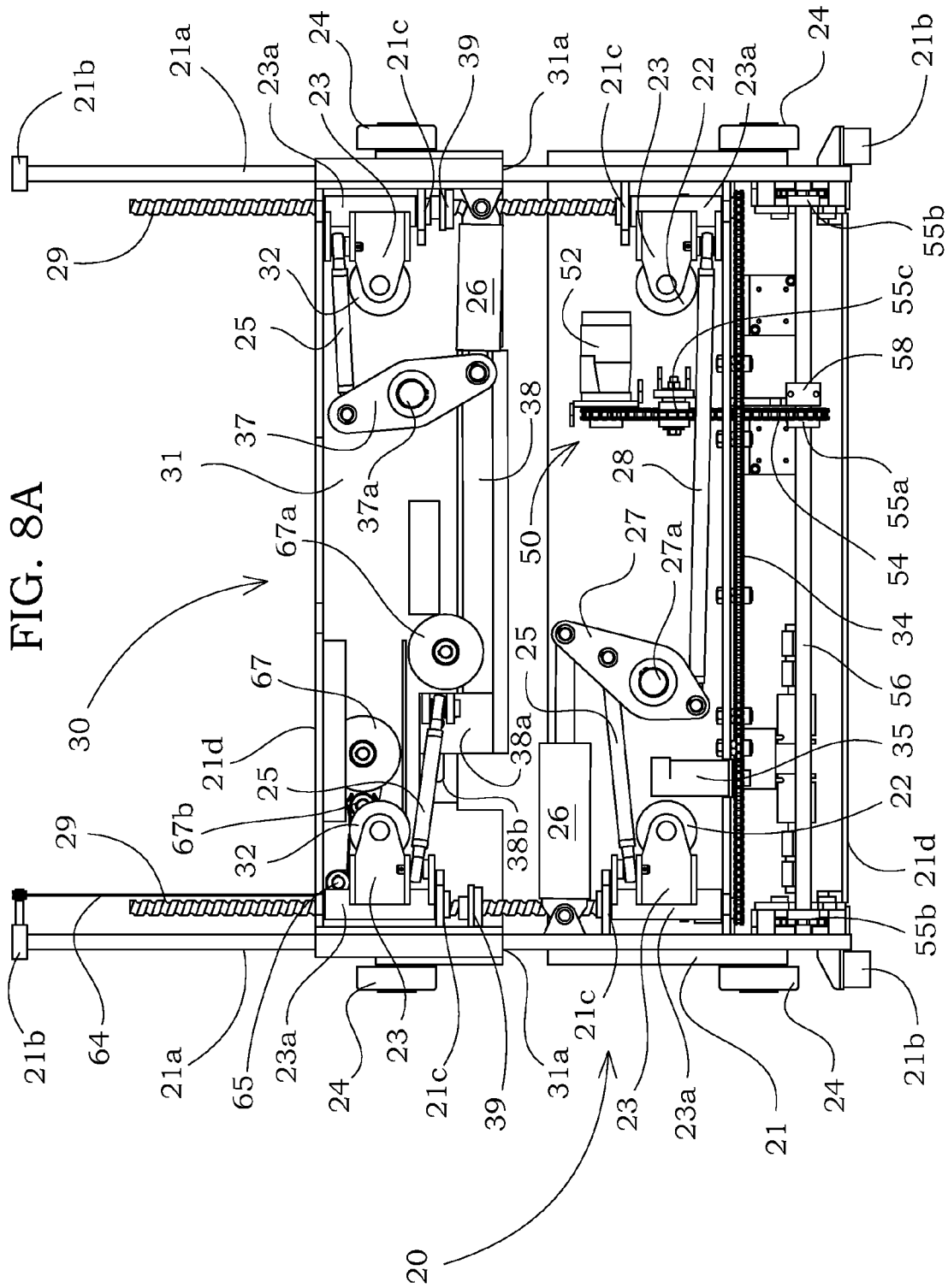
FIG. 8A is a top view of the embodiment of a front and rear roller assembly from FIG. 7, wherein the front and rear roller assemblies are separated by nearly the minimum distance allowed in that particular embodiment.
Figure 8B:
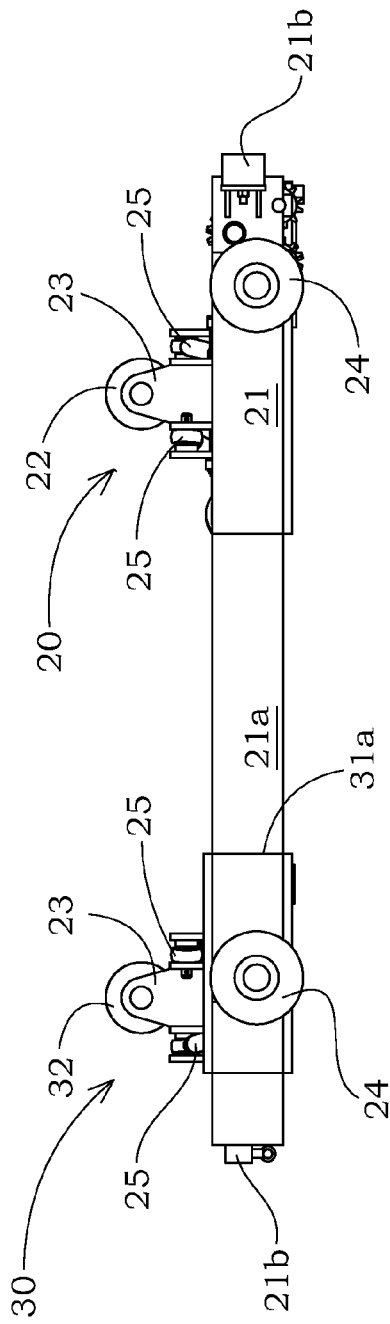
FIG. 8B is a side view of the embodiment of a front and rear roller assembly from FIG. 7 wherein the front and rear roller assemblies are spread apart from one another.
Figure 8C:
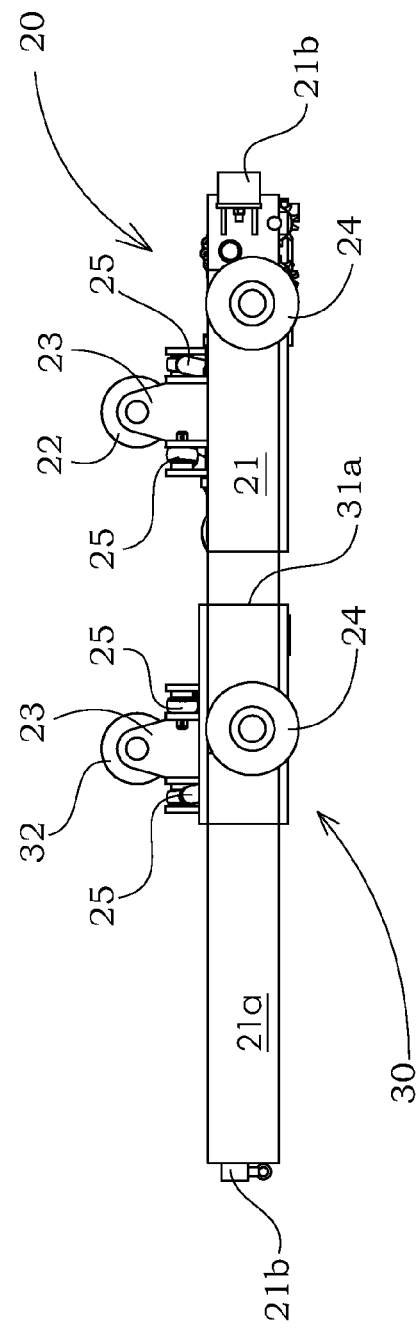
FIG. 8C is a side view of the embodiment of a front and rear roller assembly from FIG. 7 wherein the front and rear roller assemblies are positioned close to one another.
Figure 8D:
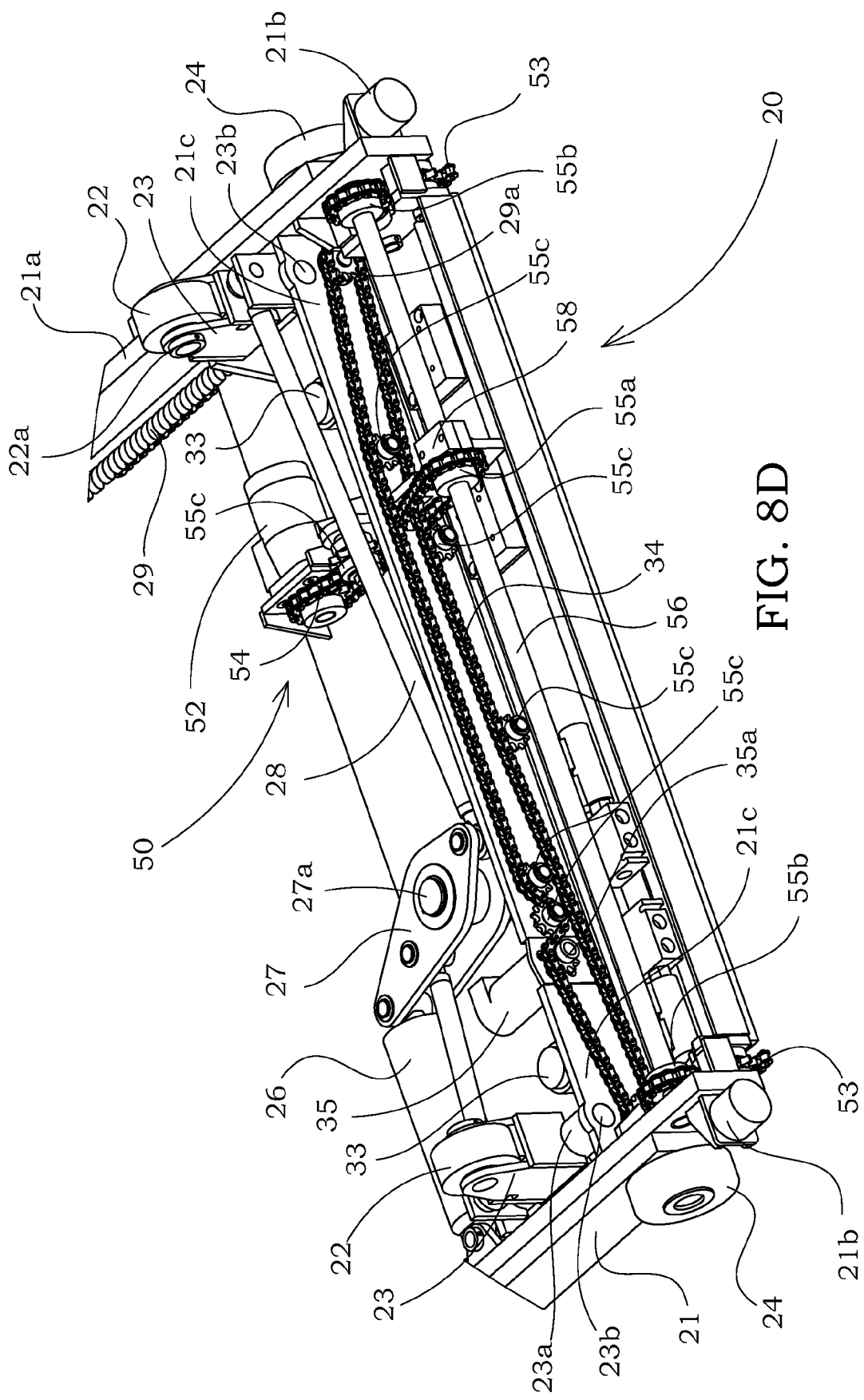
FIG. 8D is a detailed perspective view of one embodiment of a rear roller assembly as shown in FIG. 8A.

An extension bar 21a may be affixed to the rear roller assembly frame 21 on each side thereof for engagement with two corresponding extension bar receivers 31a affixed to the front roller assembly frame 31, as shown in FIGS. 7-8C. The extension bars 21a and extension bar receivers 31a increase the structure integrity and robustness of both roller assemblies 20, 30 and increase the load bearing limit thereof. It is contemplated that lubricant will be placed within the extension bar receivers 31a to reduce friction when adjusting the distance between the front and rear roller assemblies 30, 20. The extension bars 21 may also serve as limit on the proximity between the roller assemblies 20, 30 and the chock 40 (described in detail below) by use of stop tabs 21b positioned on the distal ends of each extension bar 21.

In the illustrative embodiment of the trailer and/or unloading device 10, the roller assemblies 20, 30 may be adjusted to accommodate pipe sections having an outside diameter from 16 inches to 66.5 inches, wherein the distance between the front rollers 32 and rear rollers 22 varies from about sixteen inches to thirty seven inches. However, other embodiments of the trailer and/or unloading device 10 may have roller assemblies 20, 30 configured to handle objects of other sizes and/or shapes, and the specific dimensions and orientation of the objects for which the trailer and/or unloading device 10 is designed to carry/unload in no way limits the scope of the trailer and/or unloading device 10.

Figure 4:
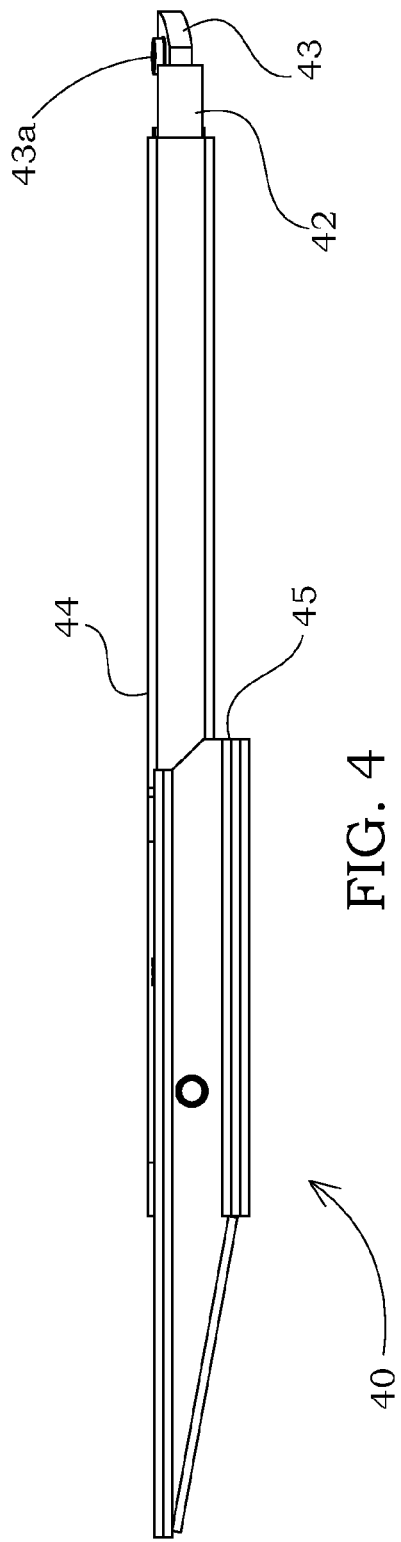
FIG. 4 is a side view of one embodiment of the chock, wherein the stop is folded down.
Figure 4A:
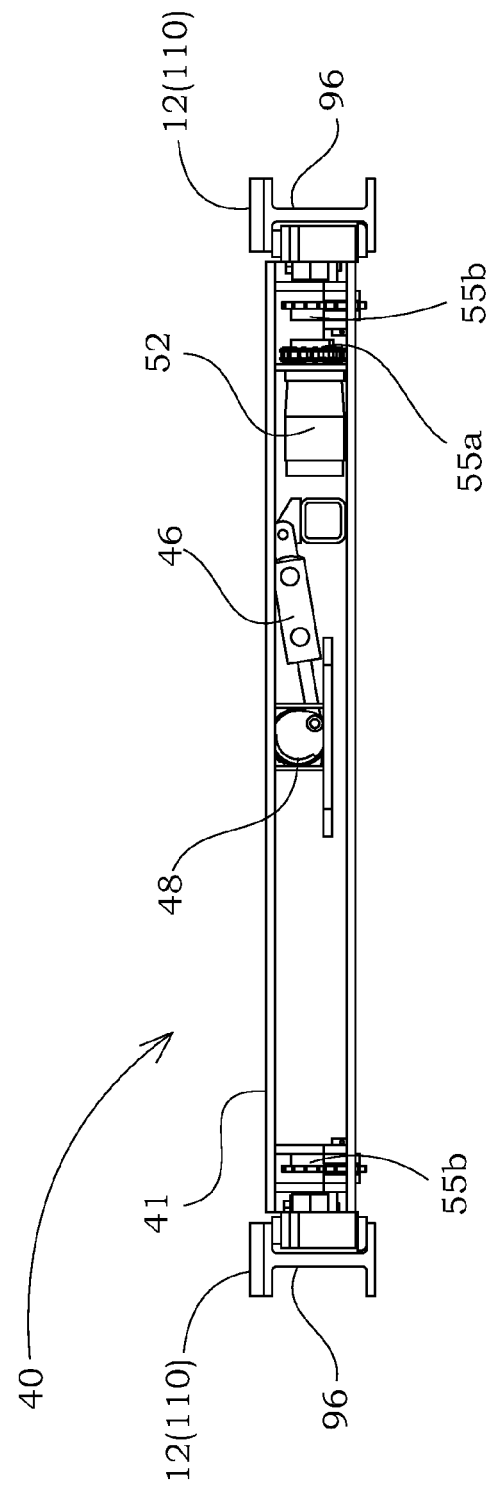
FIG. 4A is an end view of the embodiment of the chock shown in FIG. 4.
Figure 4B:
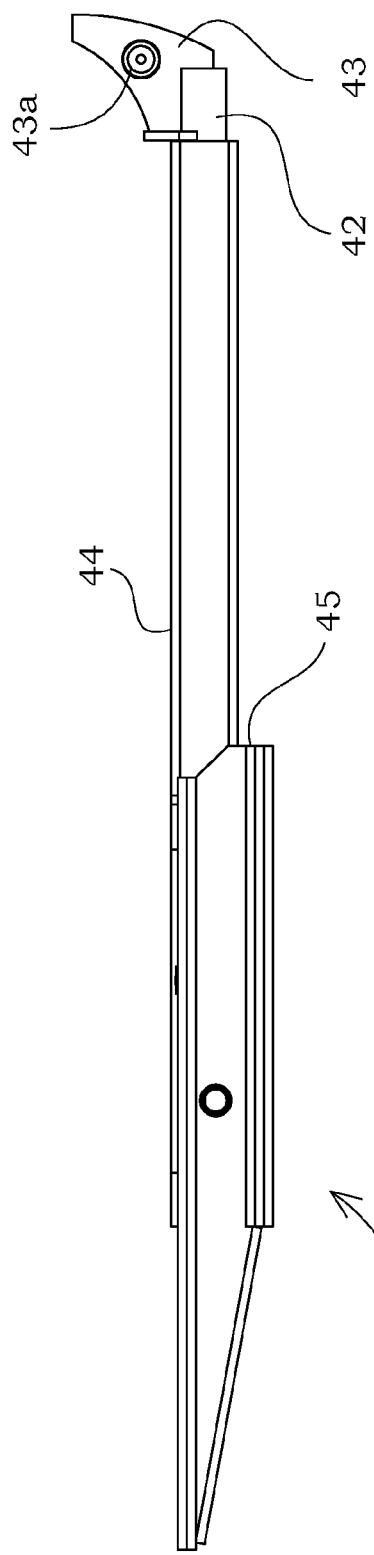
FIG. 4B is a side view of the embodiment of the chock down in FIG. 4 wherein the stop is extended up.
Figure 4C:
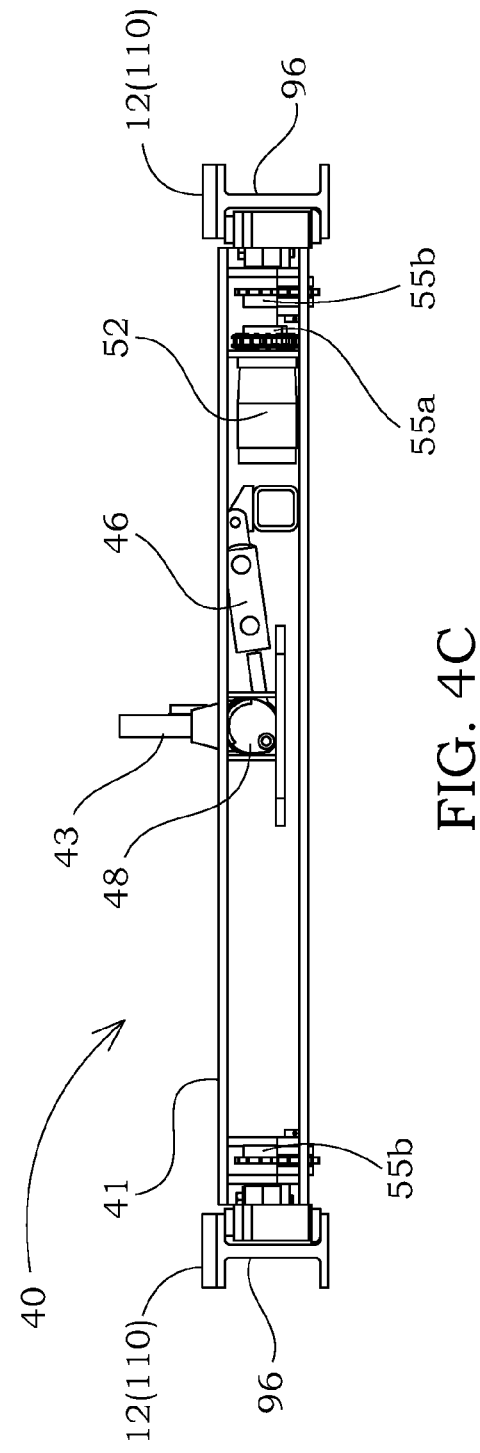
FIG. 4C is an end view of the embodiment of the chock shown in FIG. 4 wherein the stop is extended up.

The chock 40, which is shown adjacent the roller assemblies 20, 30 in FIGS. 3 & 3A, is shown in detail in FIGS. 4-5, includes a chock frame 41 that generally supports the various elements of the chock 40. In the illustrative embodiment, the lateral sides of the chock frame 41 are slidably engaged with the inside recess of the I-beam rails 96 (the same area in which the position wheels 24 of the roller assemblies 20, 30 reside) such that the chock 40 may only move along the length of the trailer and/or unloading device 10. That is, the lateral edges of the chock frame 41 reside in the same horizontal plane as the position wheels 24 for both roller assemblies 20, 30. It is contemplated that most applications will benefit from minimizing the weight of the chock frame 41 for a given capacity, and the materials of construction may be chosen accordingly. The maximum load for the chock frame 41 will vary depending on the specific application.

Pivotally attached to the chock frame 41 is a pipe engager 42. The pipe engager 42 is configured so that it may pivot with respect to the chock frame about an axis that is parallel to the I-beam rails 96. The pipe engager 42 extends from the chock frame 41 within the chock cantilever 44, which is fixedly affixed to the chock frame 41. The pipe engager 42 pivots with respect to the chock frame 41 and the chock cantilever 44 such that it may be actuated between a first and second position. In the first position, the pipe engager 42 is folded down (as shown in FIGS. 3-4A, & 5) such that the pipe engager 42 is positioned below the pipe rest 110 (which correlates to the first position of the front and rear rollers 32, 22). In the second position, the pipe engager 42 is extended upward such that the pipe engager 42 is positioned above the pipe rest 110 (which correlates to the second position of the front and rear rollers 32, 22), as shown in FIGS. 1-2, 4B & 4C. The end of the pipe engager 42 adjacent the chock cantilever 44 may be formed with a curved stop 43 for directly interfacing with a pipe section 8 so that the chock 40 may securely engage a pipe section 8 when the pipe engager 42 is in the second position.

A chock camera 43a may be affixed to the stop 43 and configured to communicate an image and/or real-time scene to the control panel 70 to assist the operator in using the trailer and/or unloading device 10. The control panel 70 is described in further detail below. The chock camera 43a may be used to locate the stop 43 properly with respect to a pipe section 8, monitor the return of the roller assemblies 20, 30, and properly position the front rollers 32.

A chock actuator 46 may be used to move the pipe engager 42 from the first position to the second position, and vice versa. In the illustrative embodiment of the chock 40 as shown herein, one end of the chock actuator 46 may be secured to the chock frame 41, and the second end of the chock actuator 46 may be secured to a pipe engager positioner 48 formed at the end of the pipe engager 42 opposite the chock cantilever 44. The engager positioner 48 may consist of an arm radially extending from the pipe engager 42. In such a configuration, extending the chock actuator 46 would urge the distal end of the radial arm away from the actuator, thereby rotating the pipe engager 42. Contracting the chock actuator 46 would have the opposite effect. It is contemplated that for safety reasons, the chock 40 will default to the second position, in which the stop 43 is positioned above the pipe rest 110 so that pipe sections 8 will not pass over the stop 43. That is, the operator must affirmatively act to lower the chock 40.

The chock cantilever 44 and the pipe engager 42 being pivotally connected therewith allow a portion of the chock 40 (i.e., the portion of the chock cantilever 44 and pipe engager 42 extending beyond the chock frame 41) to be positioned between the two front rollers 32 and/or the two rear rollers 22, as best depicted in FIGS. 3 & 3A. To accomplish this, the chock frame 41 must have a low-profile design, and the chock cantilever 44 must be long enough to allow the stop 43 to reach an area adjacent the rear rollers 22 when the distance between the roller assemblies 20, 30 is maximized. The front roller assembly frame may be formed with a chock recess 31b, as shown in FIG. 7, to accommodate a portion of the chock cantilever 44 and pipe engager 42

Additionally, the chock cantilever 44 secures the position of the chock 40 with respect to the I-beam rails 96 by imparting a torque onto the chock frame 41 when a pipe section 8 is resting on the stop 43. That is, a pipe section 8 resting against the stop 43 will generally place a downward force on the stop 43 due to gravity. This downward force is multiplied over the length of the chock cantilever 44 and communicated to the chock frame 41 due to the fixed relationship between the chock frame 41 and chock cantilever 44. Consequently, this torque causes a binding between the edges of the chock frame 41 and the inside recess of the I-beam rails 96 when a rearward load is positioned on the stop 43.

In the illustrative embodiment of the trailer and/or unloading device 10, the various elements that cooperate to actuate the rollers 22, 32 between the first and second positions and the roller assemblies 20, 30 may be made to have a low profile such that the chock cantilever 44 and a portion of the pipe engager 42 may be positioned directly above those various elements when the roller assemblies 20, 30 and chock 40 are positioned adjacent one another as shown in FIGS. 3 & 3A, and as previously described.

The extension bar 21a affixed to the rear roller assembly frame 21 may be configured to extend forward slightly beyond the front edge of the front roller assembly 30 when the distance between the roller assemblies 20, 30 is maximized. This configuration assures that the chock 40 will not collide with the front roller assembly 30 and provides a precise limit for the rearward movement of the chock 40. Additionally, or in the alternative, the interface between the front roller 30 and the chock 40 may be outfitted with an absorber 45 affixed to rear surface of the chock frame 41 adjacent the front roller assembly 30. The absorber 45 may be placed to contact a portion of the extension bar receiver 31a affixed to the front roller assembly frame 31. The absorber 45 generally serves to cushion any impact that may occur between the chock 40 and front roller assembly 30. Another absorber 45 may be affixed to the front surface of the chock frame 41 opposite the front roller assembly 30 to cushion any impact that may occur between the chock 40 and the front load stop 15.

An illustrative configuration of a drive mechanism 50 that may be used for either chock 40 or the front and rear roller assemblies 30, 20 is shown from a side view in FIG. 6 (and from a perspective view for the chock 40 in FIG. 5). In the illustrative embodiment, only the chock 40 is powered using the described drive mechanism 50. The illustrative embodiment of a drive mechanism 50 employs two parallel, fixed chains 53 that span the length of the I-beam rails 96, but which are spaced interiorly thereof, as best shown in FIG. 3. Both ends of the fixed chains 53 may be affixed to corresponding ends of the trailer and/or unloading device 10 and oriented between the I-beam rails 96. In the illustrative embodiment, the front ends of each fixed chain 53 may be affixed to the front load stop 15 and the rear ends thereof may be affixed to the cross bar 17. The drive mechanism 50 may be configured with a variable speed hydraulic motor 52 such that the may vary the speed at which the drive mechanism moves the corresponding structure (i.e., roller assemblies 20, 30 or chock 40).

A motor 52 (or other rotational power source), which may be configured as a hydraulic motor 52, may be mounted to the chock frame 41 (or to the rear roller assembly frame 21 if this type of drive mechanism 50 is used with the roller assemblies 20, 30). A roller chain 54 may be engaged with the motor 52 through conventional structures and/or methods (e.g., a sprocket affixed to the powered shaft of the motor 52) such that energizing the motor 52 causes the roller chain to rotate (which roller chain 54 is shown in FIG. 6). The roller chain 54 may also be engaged with a receiver sprocket 55a, which may be fixedly mounted to a jack shaft 56 and rotatable therewith. The jack shaft 56 may be rotatably mounted to either the chock frame 41 or rear roller assembly frame 21, depending on which drive mechanism 50 the jack shaft 56 corresponds to. A jack shaft keeper 58, as shown in FIG. 5, may be used on either end of the jack shaft 56 to rotatably secure the jack shaft 56 to the rear roller assembly frame 21 or chock frame 41. The jack shaft keeper 58 may be formed as a bearing affixed to the relative frame 21, 41, wherein one jack shaft keep 58 receives either end of the jack shaft 56.

Two powered sprockets 55b may also be affixed to the jack shaft 56 in a distal orientation thereon with respect to the receiver sprocket 55a. Accordingly, as the hydraulic motor 52 rotates, the illustrative configuration causes the jack shaft 56 and powered sprockets 55b to also rotate. The sizes of the various sprockets may be adjusted to change the torque with which and/or speed at which the jack shaft 56 and/or powered sprockets 55b rotate.

Each powered sprocket 55b may be intermeshed with corresponding fixed chains 53, as best shown from an elevated view in FIG. 5 and from a side view in FIG. 6. Two idler sprockets 55c may also be intermeshed with each fixed chain 53. The four total idler sprockets 55c associated with the drive mechanism 50 for the chock 40 may be rotatably mounted to the chock frame 41 in pairs of two at either end of the chock frame 41. Correspondingly, the idler sprockets 55c associated with the drive mechanism for the roller assemblies 20, 30 may be rotatably mounted to the rear roller assembly frame 21.

As shown in FIG. 6, the two idler sprockets 55c on one side of the chock frame 41 (or rear roller assembly frame 21) are mounted vertically with respect to one another. Accordingly, the fixed chain 53 loops backward and upward from the bottom idler sprocket 55c to the top idler sprocket 55c (from the vantage depicted in FIG. 6). As shown in FIG. 6, the top idler sprocket 55c may be in close proximity to the powered sprocket 55b to effectively trap the fixed chain 53 there between. This configuration assures that the fixed chains 53 do not slip with respect to and remain in alignment with the powered sprockets 55b and idler sprockets 55c by creating a type of gear effect. Furthermore, configuring each drive mechanism 50 with powered sprockets 55b on both ends of the jack shaft 56 ensure that the chock 40 and/or rollers assemblies 20, 30 move evenly along the I-beam rails 96 with equal power on both sides of the chock 40 and/or roller assemblies 20, 30, which also ensures proper alignment thereof.

The motor 52 for the drive mechanism 50 associated with the rear roller assembly 20 is shown in FIGS. 7 & 8, along with the corresponding components of the rear roller assembly 20 drive mechanism 50. This drive mechanism 50 employs one additional idler sprocket 55c rotatably secured to the rear roller assembly frame 21 to allow the roller chain 54 engaged with the sprocket on the motor 52 to not interfere with the chain 34 for the screws 29.

In the illustrative embodiment of the trailer and/or unloading device 10, all elements of the drive mechanism for either the rear roller assembly 20 or chock 40 may be positioned well below the pipe rest 110 on the lower half of the chock frame 41 or rear roller assembly frame 31, respectively. Additionally, because the front roller assembly 30 is positioned between the rear roller assembly 20 and the chock 40, the drive mechanisms 50 for both the chock 40 and the rear roller assembly 20 may use the same two fixed chains 53.

The front ends of each fixed chain 53 may use a tensioning system to adjust the tension of each fixed chain 53. Additionally, one of the fixed chains 53 may have a tensioning system at both ends thereof so that the chock 40 and roller assemblies 20, 30 may be aligned within the I-beam rails 96 independently of one another.

Figure 2A:
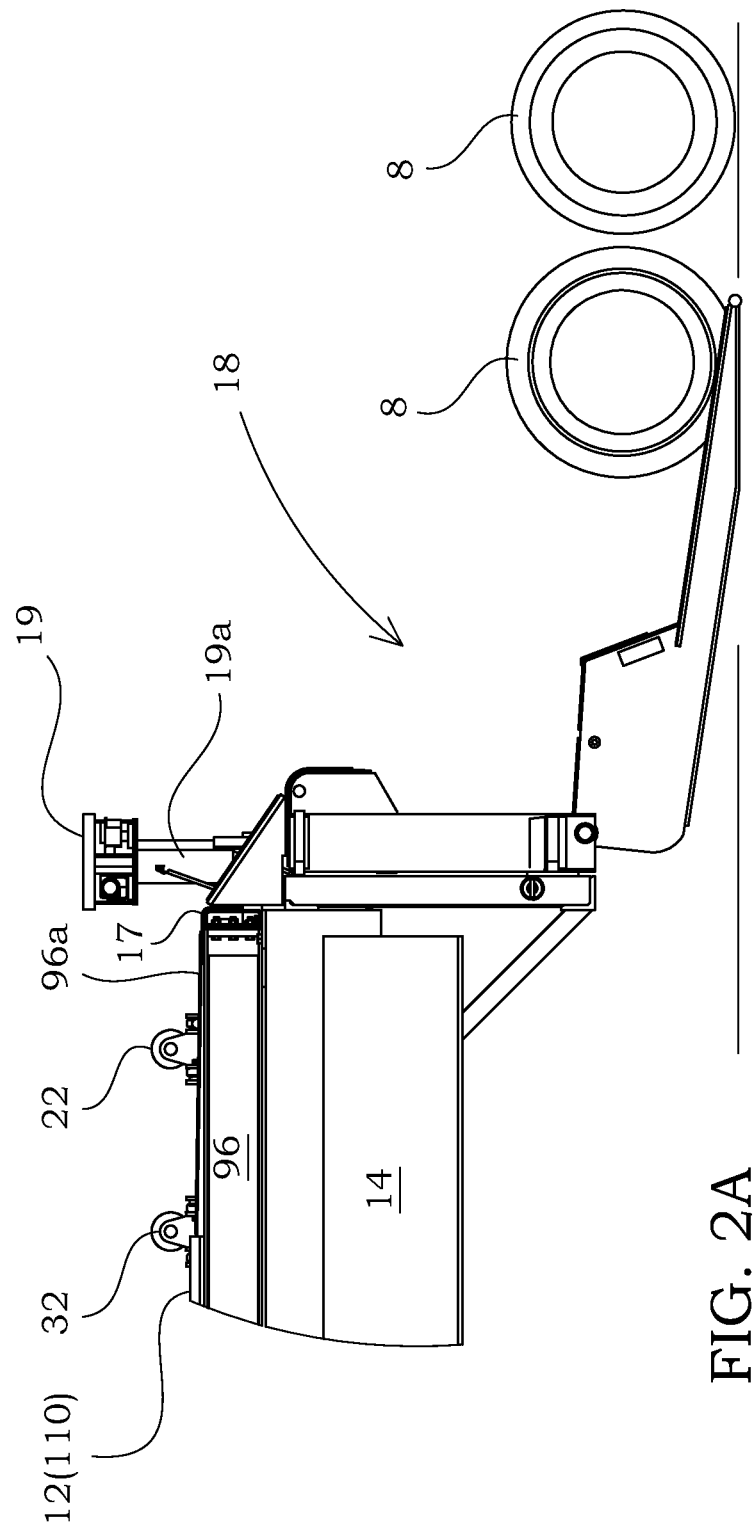
FIG. 2A is a depiction of a second point in time using a method of unloading objects according to one embodiment of the trailer and/or unloading device.

In the illustrative embodiment, an unloader 18 is affixed to a rearward portion the trailer frame support 14 as best shown in FIGS. 2 & 2A. In other embodiments not pictured herein, the unloader 18 may be affixed to the cross bar 17 at the rear terminals of the I-beam rails 96, and/or I-beam rails 96 at rearward portions thereof. At the rear-most section of the I-beam rails 96, the I-beam rails 96 may be formed as an I-beam rail ramp 96a sloping downward toward the unloader 18. The unloader 18 may be of any type of automatic unloader 18 that brings the load from the trailer deck 12 to the ground in a controlled fashion with limited involvement of the operator. However, it is contemplated that the illustrative embodiment of the trailer and/or unloading device 10 will be especially useful when used with unloaders 18 designed for specifically unloading pipe sections 8, such as the unloader 18 described in U.S. Pat. No. 2,776,762, which is incorporated by reference herein in its entirety. Furthermore, it is contemplated that the unloader 18 in the illustrative embodiment of the trailer and/or unloading device 10 will have a capacity of approximately 11,000 pounds. However, the specific unloader 18 employed in no way limits the scope of the trailer and/or unloading device 10.

The rear roller assembly 20, front roller assembly 30, and/or chock 40 may be removed from the trailer and/or unloading device 10 for maintenance or repair by first removing the cross bar 17 from the rear terminals of the I-beam rails 96. Next, the powered sprocket 55b and idler sprockets 55c may be disengaged with the fixed chains 53 and the respective unit (i.e., rear roller assembly 20, front roller assembly 30, and/or chock 40) may be removed. At this point the rear roller assembly 20, front roller assembly 30, and/or chock 40 may be removed from the trailer and/or unloading device 10 through the rearward end thereof.

An arm 19a may be mounted to the trailer and/or unloading device 10 adjacent the cross bar 17 at the rear terminals of the I-beam rails 96. The arm 19a may be configured to swing about a rotational axis immediately adjacent one of the I-beam rails 96 such that the arm 19a may be folded for transport and extended when unloading objects. Two rear-facing cameras 19 may be mounted to the arm 19a such that at least one camera 19 may capture the view behind the trailer and/or unloading device 10 (i.e., the area where the pipe sections 8 are unloaded). Another camera 19 may serve to monitor the operation of the unloader 18. Alternatively, this camera 19 may be mounted to a portion of the trailer and/or unloading device 10 toward the rear thereof as opposed to an arm 19a. The camera 19 pointed toward the rear of the trailer and/or unloading device 10 may be configured to communicate an image and/or real time scene to the control panel 70 to assist the operator in using the trailer and/or unloading device 10. The control panel 70 is described in further detail below.

The arm 19a may be configured to swing out from the edge of the I-beam rail 96 by approximately 24 inches. This will ensure that the cameras 19 mounted thereto are not obstructed by an object positioned adjacent the rear terminals of the I-beam rails 96. The cameras 19 may be any type suitable for the application, which may be cameras 19 designed for outdoor use or cameras 19 designed for indoor use, depending on the embodiment of the trailer and/or unloading system 10. If the cameras are designed for indoor use, they may be positioned within an enclosure during use and/or removed at times of non-use for additional protection and longevity.

Another camera 19 may be mounted to the trailer and/or unloading device 10 adjacent the outside area of one of the I-beam rails 96 near the rear of the trailer and/or unloading device 10 and facing forward so as to monitor each pipe section 8 during unloading and the various operations of the trailer and/or unloading device 10. Alternatively, this camera 19 may also be mounted to the arm 19*a*. This camera 19 may communicate with the control panel 70 in the manner as previously described for other cameras 19, 43*a*. The various cameras 19 may be direct-wired to a control panel 70, or they may communicate with a display through wireless technology. The specific placement of the cameras 19 and/or structure to which they are mounted in no way limits the scope of the trailer and/or unloading device 10 as disclosed and claimed herein. As a redundant safety mechanism, motion sensors (not shown) may be positioned adjacent the unloader 18 to alert the operator if motion is detected in the area to which the object is to be unloaded.

As previously stated, in the illustrative embodiment of the trailer and/or unloading device 10 the chock 40 and roller assemblies 20, 30 are hydraulically powered. However, in other embodiments of the trailer and/or unloading device 10 not pictured herein, those elements may be pneumatically powered, electrically powered, or use any other power source. Accordingly, the scope of the trailer and/or unloading device 10 is in no way limited by the power source used in any of the components thereof.

The roller assemblies 20, 30 and chock 40 are shown positioned adjacent the front of the trailer and/or unloading device 10 from an elevated perspective in FIG. 3A. One example of a type of hydraulic power system 60 for the trailer and/or unloading device 10 is shown generally in FIG. 3A. In the embodiment of a hydraulic power system 60 shown in FIG. 3A, the hydraulic power system 60 comprises a source of rotational power (which may be an internal combustion engine (not shown)) that provides energy to a pump unit 62. The source of rotational power may be integrated with the pump unit 62 for efficiency in packaging. It is contemplated that a pump unit 62 capable of producing a pressurized fluid at 2500 psi at a flow rate of 14 gallons per minute will be adequate for most applications of the trailer and/or unloading device 10. However, pumps having different specifications may be used with the trailer and/or unloading device 10 without departing from the spirit and scope thereof. Furthermore, certain trailers and/or unloading devices 10 will not be equipped with a dedicated pump unit 62, and instead will draw pressurized fluid from a hydraulic system on a prime mover 11, such as a truck or tractor.

At least one hydraulic reel 66 and at least one electric reel 68 may be mounted to the trailer and/or unloading device 10 toward the front thereof. The illustrative embodiment of the trailer and/or unloading device 10 includes one electric reel 68 and one hydraulic reel 66 associated with the roller assemblies 20, 30 and one electric reel 68 and one hydraulic reel 66 associated with the chock 40.

The hydraulic reel(s) 66 and electric reel(s) 68 may be spring return reels that automatically take up any slack detected in the line, they may be powered, or the reels 66, 68 may be of a different type. The hydraulic reel(s) 66 may contain dispensable fluid conduit (not shown) to bring the drive mechanisms 50 for the rear roller assembly 20 and chock 40 in fluid communication with the hydraulic power system 60. The fluid conduit may also be used to bring any actuator(s) 26 and/or chock actuator 46 in fluid communication with the hydraulic power system 60. The electric reel(s) 68 may contain dispensable electrical conduit (not shown) to bring the control mechanisms mounted to the roller assemblies 20, 30 and/or chock 40 into electrical communication with the control panel 70. Accordingly, the control and manipulation of the several elements of the roller assemblies 20, 30 and/or chock 40 may be controlled remotely using the control panel 70.

Because the distance between the front and rear roller assemblies 30, 20 is variable, the pictured embodiment of the trailer and/or unloading device 10 includes a moveable pulley 67 and dual pulley 67*a* positioned on the front roller assembly 30, 20. These pulleys 67, 67*a* remove slack in the hydraulic conduit between the front and rear roller assemblies 30, 20 when the distance there between is adjusted using the screws 29. In the illustrative embodiment, it is contemplated that the hydraulic conduit will pass from the rear roller assembly 20 to the front roller assembly 30 such that the hydraulic conduit interfaces with the dual pulley 67*a* on the right side thereof and with the moveable pulley 67 on the left side thereof when viewed from the vantage shown in FIG. 8A. It is contemplated that from the moveable pulley 67 the hydraulic conduit will run to the actuator 26 associated with the front roller assembly 30.

Because a supply and return hydraulic conduit will be required, it is contemplated that the two hydraulic conduits will be in a stacked configuration, wherein each follows the same path but at slightly different elevations. Accordingly, both the dual pulley 67*a* and moveable pulley 67 in the illustrative embodiment are configured to interface with two separate hydraulic conduits. Furthermore, in the illustrative embodiment it is contemplated that the hydraulic conduit will be configured as 0.25 inch high-pressure hydraulic hose.

When the roller assemblies 20, 30 are positioned close to one another, the moveable pulley 67 may be positioned away from the dual pulley 67*a*, thereby accounting for any slack in the hydraulic and/or electrical conduit. Conversely, when the roller assemblies 20, 30 are positioned apart from one another, the moveable pulley 67 may be positioned adjacent the dual pulley 67*a*. In the illustrative embodiment, the hydraulic conduit may be routed such that the distance by which the front and rear roller assemblies 30, 20 may be separated dictates the amount by which the moveable pulley 67 must travel with respect to the dual pulley 67*a*. For example, if the roller assemblies 20, 30 may be separated by a maximum of 21 inches, then the axis of the moveable pulley 67 must be allowed to travel 10.5 inches with respect to the axis of the dual pulley 67. This is because the hydraulic conduit wraps around the left side of the dual pulley 67 and then in a general right hand direction to the actuator 26 on the front roller assembly 30 (as previously described) when viewed from the vantage shown in FIG. 8A. This configuration doubles the hydraulic conduit back on itself and results in a ratio of 2:1. This ratio may be different in different embodiments, depending at least on the number of dual pulleys 67*a* and/or moveable pulleys 67 used and the routing of the hydraulic conduit.

The amount by which the moveable pulley 67 travels with respect to the dual pulley 67*a* during the movement of either roller assembly 20, 30 with respect to the other roller assembly 20, 30 may be linked to one another. Such linking allows the proper amount of slack or take-up in the hydraulic conduit connecting the roller assemblies 20, 30. In the illustrative embodiment, a cable 64 is affixed at its first end to the front roller assembly frame 31 and at its second end to the distal end of the extension bar 21*a*, as best shown in FIG. 8A. The cable 64 engages a cable interface 67*b* pivotally mounted to the moveable pulley 67 and a frame cable interface 65 pivotally mounted to the front roller assembly frame 31.

As the screws 29 rotate in a first direction, the front roller assembly 30 moves away from the rear roller assembly 20, as previously described. As this happens, the distal ends of the extension bars 21a move away from the front roller assembly frame 31. Accordingly, the distance between the two ends of the cable 64 increases, which causes the moveable pulley 67 to move away from the dual pulley 67a (as depicted in FIG. 8A). As the screws 29 rotate in a second direction, the front roller assembly 30 moves toward the rear roller assembly 20. As this happens, the distal ends of the extension bars 21a move toward the front roller assembly frame 31 and the distance between the two ends of the cable 64 decreases. This allows the moveable pulley 67 to move toward the dual pulley 67a (as depicted in FIG. 7). The moveable pulley 67 may be biased in a direction toward the dual pulley 67a, or the tension from the hydraulic conduit as the roller assemblies 20, 30 move apart from one another may urge the moveable pulley 67 toward the dual pulley 67a.

This is but one of an infinite number of ways to remove slack in the hydraulic conduit, and similar systems may be used for electrical conduit. The illustrative embodiment of a slack removal system no way limits the scope of the trailer and/or unloading device 10 as disclosed and claimed herein. Accordingly, and suitable structure and/or method for removing slack may be used. Furthermore, all components of any slack reduction system may be positioned low in the roller assembly 20, 30 so as to not interfere with the movement of the chock 40 over either roller assembly 20, 30.

Figure 10:
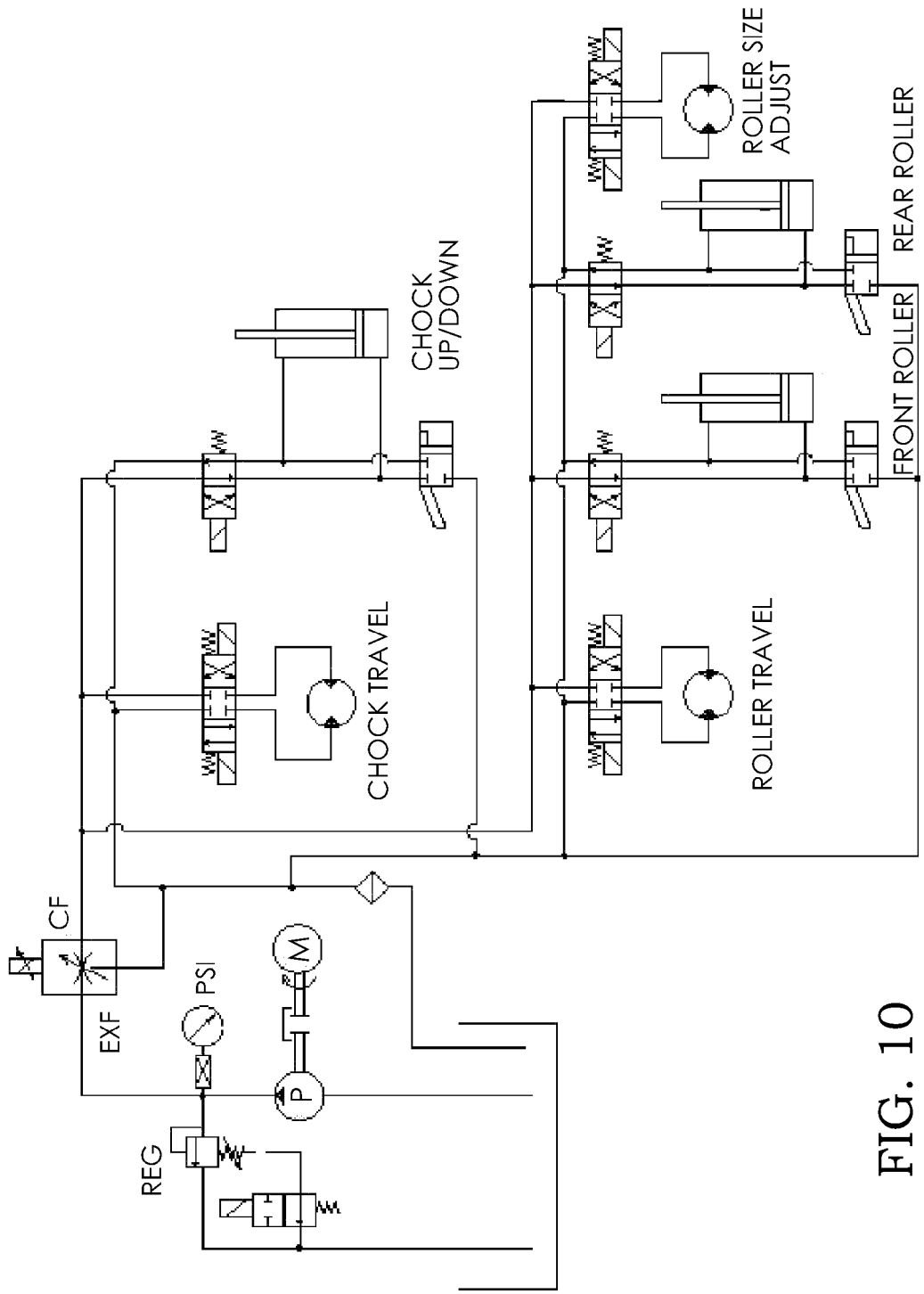
FIG. 10 is a schematic view of one embodiment of a hydraulic power system that may be used with various embodiments of the trailer and/or unloading system.

Various control valves, circuits, switches, etc. will be required for the various systems of the trailer and/or unloading device 10. In light of the present disclosure, these components will be self-evident to those skilled in the art, and are therefore not discussed further herein for purposes of clarity. However, FIG. 10 does provide a schematic diagram of one embodiment of a hydraulic power system 60 that may be used with the trailer and/or unloading device 10.

In one embodiment of the trailer and/or unloading device 10 the hydraulic power system 60 may be configured with a manual unload valving system, which the operator may use in the event that the hydraulic power system 60 or a component thereof is no longer properly functioning. It is contemplated that in such a situation, the chock 40 and rear rollers 22 would default to the second position to impede the movement of an object toward the unloader 18. The manual unload valving system would allow the operator to lower the chock 40 and/or rear rollers 22 without the use of the control panel 70 or the hydraulic power system 60. However, for safety reasons it is contemplated that such a manual unload valving system will have multiple safety features requiring affirmative action by the operator.

As shown generally in FIG. 3A, the entire hydraulic power system 60 (including the engine and pump unit 62, if needed), hydraulic reel(s) 66, and/or electric reel(s) 68 may be positioned toward the front of the trailer and/or unloading device 10 such that the front load stop 15 would protect those components from the chock 40. The front load stop 15 may be formed with a plurality of cushions 33 and/or absorbers 45 thereon (neither shown on the front load stop 15 in FIG. 3A), or it may simply provide a specific area of contact between the front load stop 15 and the chock frame 41. As previously mentioned, the front load stop 15 may also serve as a hydraulic reservoir.

Although not shown, the trailer and/or unloading device 10 may be configured with a predetermined amount of trailer camber to increase the load-bearing capacity thereof, which would necessitate a certain amount of camber being built into the I-beam rails 96. In another embodiment of the trailer and/or unloading device 10, the I-beam rails 96, unloader 18, roller assemblies 20, 30, and chock 40 are retrofit onto an existing, prior art flatbed trailer (not shown). In such an embodiment, the I-beam rails 96 must be properly configured to securely fit to the flatbed trailer, and the necessity for a hydraulic power system 60 will depend on the prime mover 11 used to tow the trailer and/or the existing architecture of the flatbed trailer.

An anchor system 90 may be used to ensure that the I-beam rails 96, roller assemblies 20, 30, and chock 40 may be retrofit onto a wide array of existing, prior art flatbed trailers. Because the chock 40 is positioned toward the front of the trailer and/or unloading device 10 with respect to the roller assemblies 20, 30, neither roller assembly 20, 30 is capable of reaching the front-most pipe sections 8. Accordingly, the anchor system 90 (positioned toward the front of the trailer and/or unloading device 10) allows an operator to adjust the slope of the trailer deck 12 at the front thereof.

Figure 11:
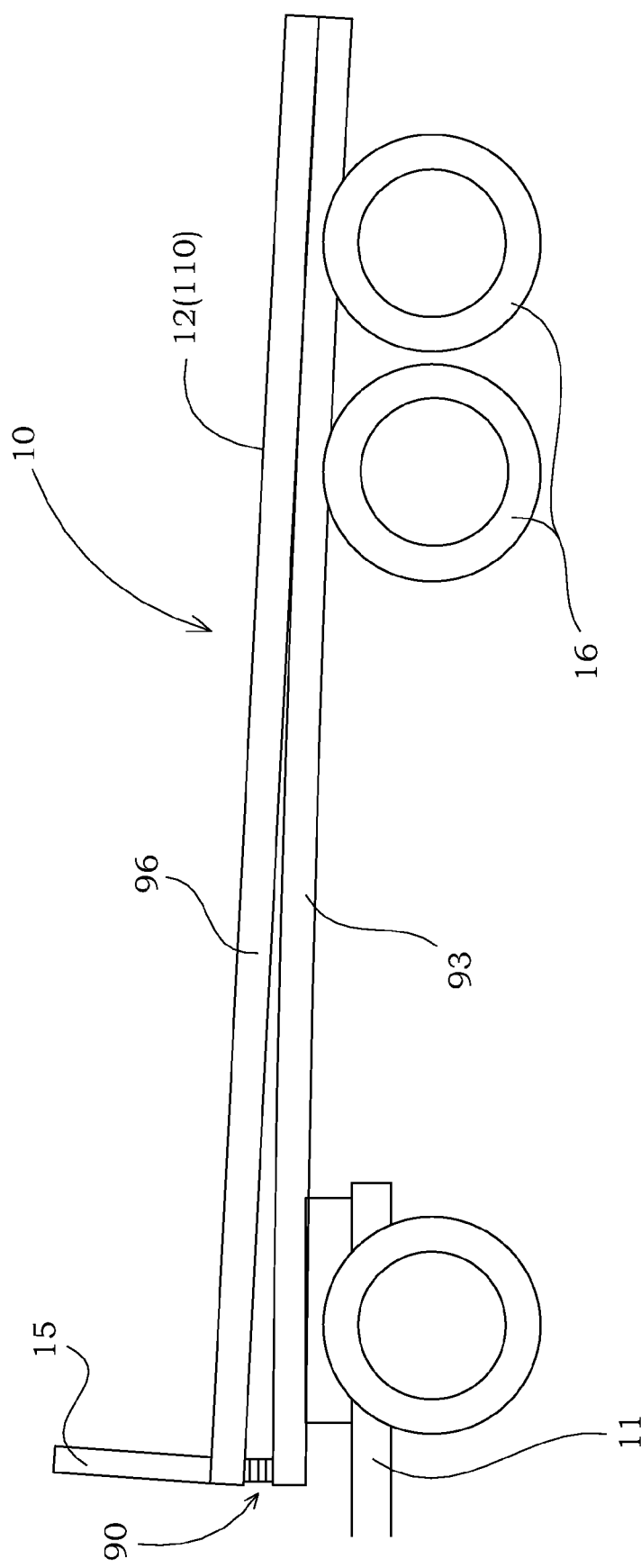
FIG. 11 is a side view of one embodiment of the trailer and/or unloading device showing the camber of a trailer.

A general side view of one embodiment of an anchor system 90 is shown in FIG. 11, and FIGS. 12A & 12B provide detailed end and side views thereof. As shown in FIG. 12A, the I-beam rails 96 may be affixed to lateral supports 13 connecting one I-beam rail to the other. Both I-beam rails 96 and all lateral supports 13 may be affixed to an existing flatbed surface 93. Bolts 102 are used to secure the I-beam rails 96 to the existing flatbed surface 93 in the illustrative embodiment, but the specific method and/or structure used in no way limits the scope of the trailer and/or unloading device 10.

Outriggers 94 may be affixed to the outside portion of each I-beam rail 96 for additional load-bearing capability if needed. Outriggers 94 may brace the I-beam rails 96 in the case of shearing forces caused by uneven surfaces, such as the crown of a road. As shown in FIG. 12B, one or more bearing plates 106 and/or steel washers 108 may be positioned around the bolts 102 securing the I-beam rails 96 and/or outriggers 94 to the existing flatbed surface. Because the camber built into existing flat bed trailers may vary by up to eight inches from one trailer to the next, the anchor system 90 may allow for both camber and welding deflection of the I-beam rails 96 and/or existing flat bed surface 93.

Bearing plates 106 may be used to distribute the forces more evenly over the existing flatbed surface 93. Washers 108 may be positioned adjacent bearing plate 106 to allow one to properly level the I-beam rails 96 to account for any camber in a trailer. The bearing plates 106 may be threaded to better retain the washers 108. If the bearing plates 106 are threaded, the washers 108 may be retained thereby even if the bolts 102 and I-beam rails 96 are removed.

The specific configuration, dimensions, material of construction, and number of bearing plates 106 and/or washers 108 will vary from one embodiment of the trailer and/or unloading device 10 to the next, and is therefore in no way limiting. It is contemplated that the elevation change from the front of the trailer and/or unloading device 10 to the front-most position to which the front roller 30 may reach should be merely enough to allow the front-most pipe section 8 to slowly traverse the I-beam rails 96 toward the rear of the trailer and/or unloading device 10 (up to the front roller assembly 20) due solely to the force of gravity. Other structures and/or methods for accounting for camber in an existing flatbed surface 93 are known to those skilled in the art, and therefore the specific structure and/or method used, if any, in no way limits the scope of the trailer and/or unloading device 10.

The I-beam rails 96 may also be configured with an I-beam rail ramp (not shown) toward the rear terminals of the I-beam rails 96. As an object approaches the unloader 18, an automatic stop may be placed just ahead of the unloader 18 (which may be the stop tabs 21b on the rear side of the rear roller assembly 20 in some embodiments). The automatic stop may be programmed into the control panel 70 as a combination of a sensor and a switch, or it may be a mechanical structure that alerts the operator to the specific position of the object. In one embodiment, the automatic stop will remove all power to the rear roller assembly 20 until the operator reenergizes it. Accordingly, the presence or absence of an automatic stop, or the specific embodiment thereof in no way limits the scope of the trailer and/or unloading device 10 as disclosed and claimed herein. The I-beam rail ramp may be positioned between this stop and the unloader 18. Such an automatic stop enhances the safety of the trailer and/or unloading device by allowing the operator to determine if the requisite space behind the unloader 18 is present, and to ensure the unloader 18 is properly positioned. When the proper precautions have been made, the I-beam rail ramp facilitates the movement of an object to the unloader 18.

Figure 9:
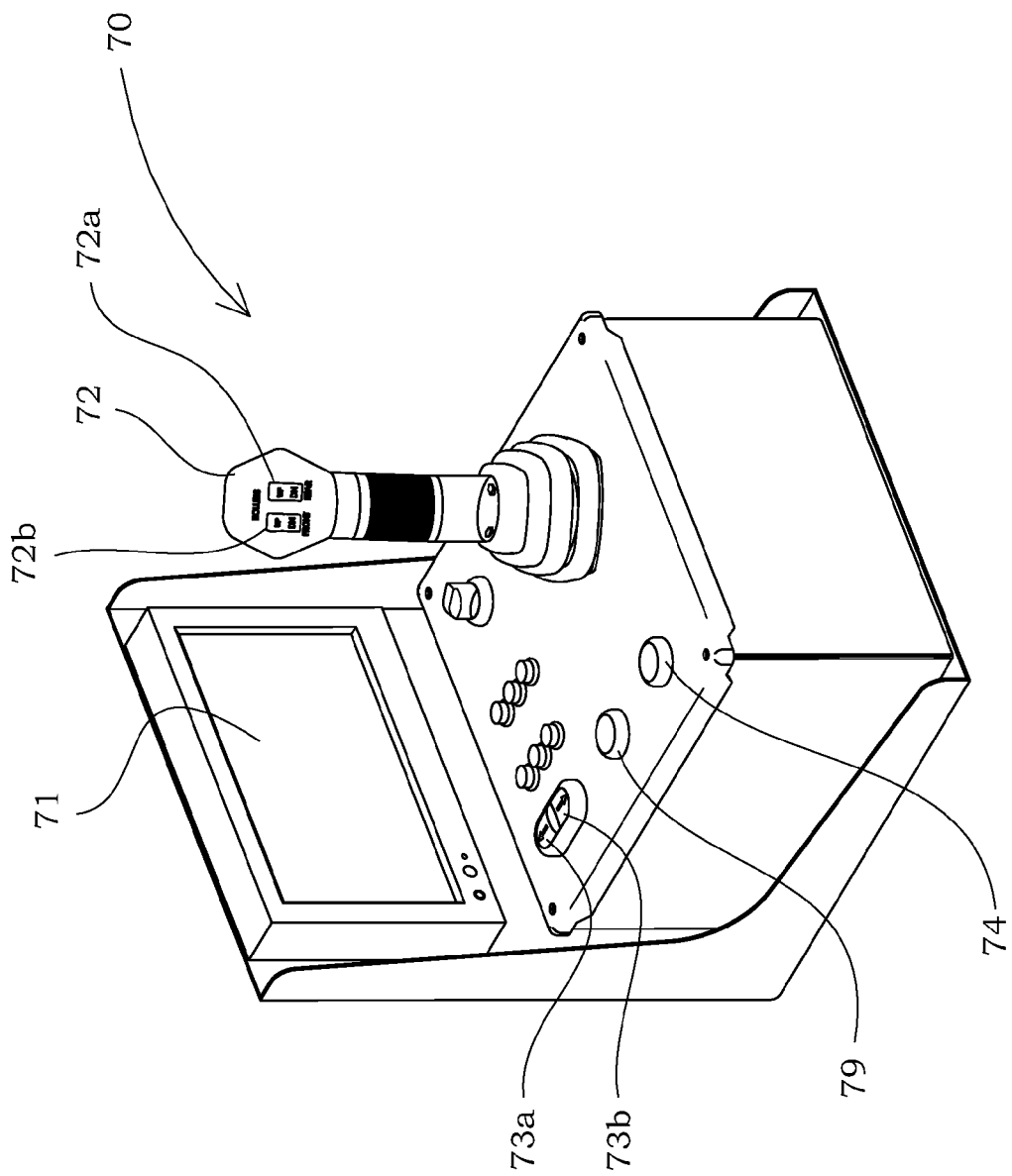
FIG. 9 is a perspective view of one embodiment of a control panel that may be used with various embodiments of the trailer and/or unloading device.
Figure 9A:
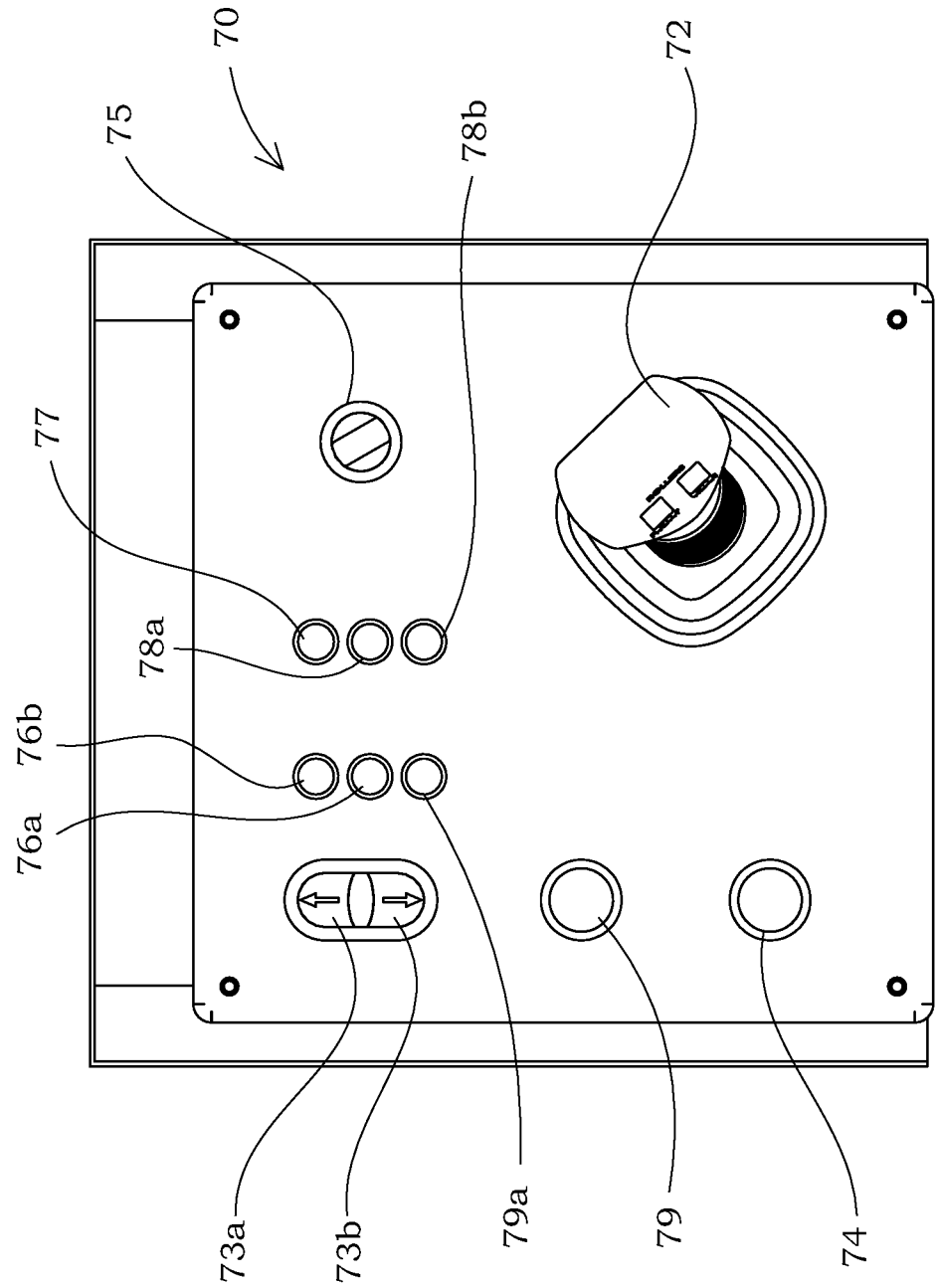
FIG. 9A is a top view of the embodiment of a control panel from FIG. 9 that may be used with various embodiments of the trailer and/or unloading device.

One embodiment of a control panel 70 for use with the trailer and/or unloading device 10 is shown generally in FIGS. 9 & 9A. In the illustrative embodiment of the control panel 70, it is contemplated that the control panel 70 will be positioned in or adjacent to the cab of the prime mover 11. In this embodiment, the control panel 70 includes one video display 71 that may receive video signals from any one of the four cameras 19 that may be employed with the trailer and/or unloading device 10. In such an embodiment, the control panel 70 may also include a video feed switch (not shown) that allows the operator to select which camera's 19 video feed is displayed on the video display 71. Alternatively, the control panel may be equipped with a dedicated video display 71 for each camera 19, or video displays 71 may be positioned remotely from the control panel 70.

A first video display 71 or video feed may provide an image and/or real-time scene of the area behind the trailer and/or unloading device 10, which includes the position of pipe sections 8 on the ground adjacent the trailer and/or unloading device 10 and helps to ensure that no obstacles or people are present for unloading the next pipe section 8. A second video display 71 or video feed may provide an image and/or real-time scene of the trailer and/or unloading device 10 as viewed from the rear to the front thereof. It is contemplated that this video display 71 or video feed will monitor the position of the roller assemblies 20, 30, chock 40, and any pipe sections 8 positioned on the pipe rest 110 along the length of the trailer and/or unloading device 10. A third video display 71 or video feed may provide an image and/or real-time scene of the area adjacent the unloader 18 to assist the operator in monitoring the movements and proper functioning thereof. A fourth video display 71 or video feed may provide an image and/or real-time scene of the portion of the trailer and/or unloading device 10 positioned forward of the chock 40 at any moment in time. This video display 71 may aide the operator in determining when the chock 40 should be actuated between the first and second positions, as well as when the rear rollers 22 should be actuated between the first and second positions. It is contemplated that this video display 71 or video feed will be coupled to a camera 19 positioned in the chock 40, if such camera 19 is used for that particular embodiment of the trailer and/or unloading device 10.

A joystick 72 may also be positioned on the control panel 70. In the illustrative embodiment, the joystick 72 actuates through an X-shaped pattern. The two forward legs correspond to forward motion (along the length of the trailer and/or unloading device 10) of either the chock 40 or the roller assemblies 20, 30, and the two rearward legs correspond to rearward motion of either the chock 40 or the roller assemblies 20, 30. It is contemplated that the joystick 72 may be configured so that the further the operator moves the joystick 72 along the leg of the X associated with the roller assemblies 20, 30, the faster the roller assemblies 20, 30 will move in the specified direction. By contrast, it is contemplated that the joystick 72 may be configured such that the chock 40 moves at only one speed in either the forward or rearward direction.

A first joystick switch 72a may be positioned adjacent the area in which the operator's thumb would be during use. The first joystick switch 72a may be configured as a rocker switch, may be configured to control the actuation of the rear rollers 22 between the first and second positions, and vice versa. A second joystick switch 72b may be similarly positioned and configured to control the actuation of the front rollers 32 between the first and second positions. Alternatively, a trigger switch (not shown) may be positioned along the stem of the joystick 72 to control the actuation of the front rollers 32 between the first and second positions.

An expand button 73a and corresponding retract button 73b may be positioned on the control panel 70 to control the distance between the roller assemblies 20, 30. Each button 73a, 73b would cause the screws 29 to be energized in a specific direction, as previously described above. As shown, these two buttons 73a, 73b are integrated into a single rocker switch, but may have an infinite number of embodiments.

It is contemplated that the default position for the chock 40 will be the second position, wherein the stop 43 is positioned above the pipe rest 110 so as to not allow any pipe sections 8 to pass by the chock 40. A chock-lower button 74 may be positioned on the control panel 70. Pressing the chock-lower button 74 will actuate the chock actuator 46 from the second position to the first position. For the chock 40 to remain in the first position, the operator must hold down the chock-lower button 74. The chock 40 will automatically actuate from the first position to the second position when the operator releases the chock-lower button 74. The control panel 70 may be configured to provide a first sensory indication (such as a chock-up indicator 76b consisting of a green light) when the chock 40 is in the second position, and a second sensory indication (such as a chock-down indicator 76a consisting of a red light and/or audible alarm) when the chock 40 is in the first position. As previously described, the lateral position of the chock 40 along the length of the trailer and/or unloading device 10 may be manipulated via the joystick 72. However, unlike the roller assemblies 20, 30, it is contemplated that the chock 40 will travel laterally at only one speed. The control panel 70 may be configured with a chock-position lock 75 that allows the operator to manually override the default position of the chock 40 and lock it in the first position.

When the hydraulic pressure of the drive mechanism 50 associated with the chock 40 experiences peak pressure, the chock 40 is abutted with a load (e.g., a pipe section 8, the front load stop 15, or the front roller assembly 30). Accordingly, the control panel 70 may include a chock-peak-pressure indicator 78a, which may be configured as a light on the control panel 70 or other sort of alert. The chock-peak-pressure indicator 78a in conjunction with the video displays 71 previously described will allow the operator to determine with what object the chock 40 is in contact and then act accordingly. For example, if the video displays 71 indicate that the stop 43 is in contact with a pipe section 8, then the operator will know it is safe to lower the front rollers 32 and move the roller assemblies 20, 30 forward.

Figure 1B:
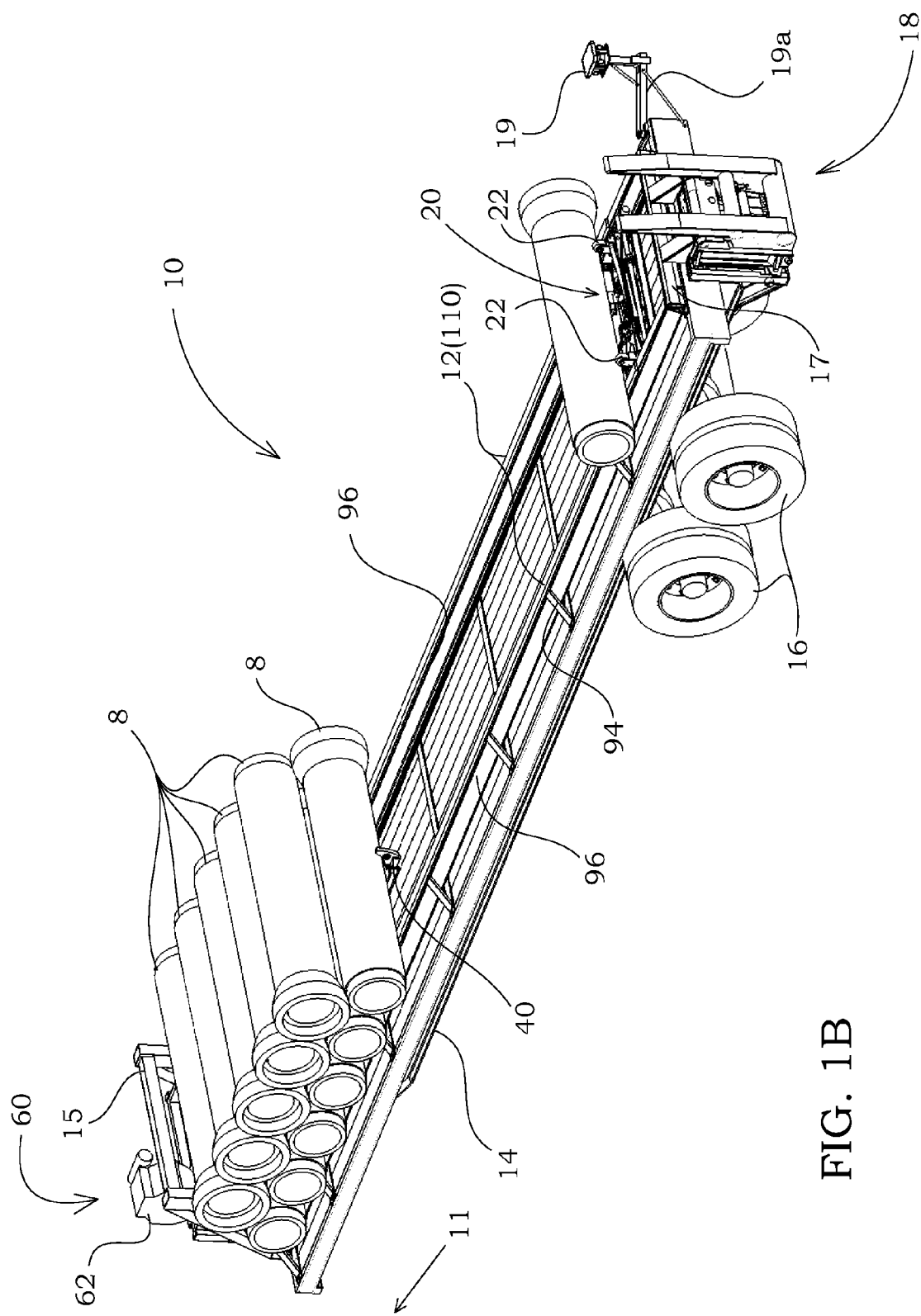
FIG. 1B provides a perspective view of a first embodiment of the trailer and/or unloading device with one object in an intermediate position adjacent the unloader and engaged with front and rear roller assemblies, wherein the next object for unloading is restrained by the chock.
Figure 1C:
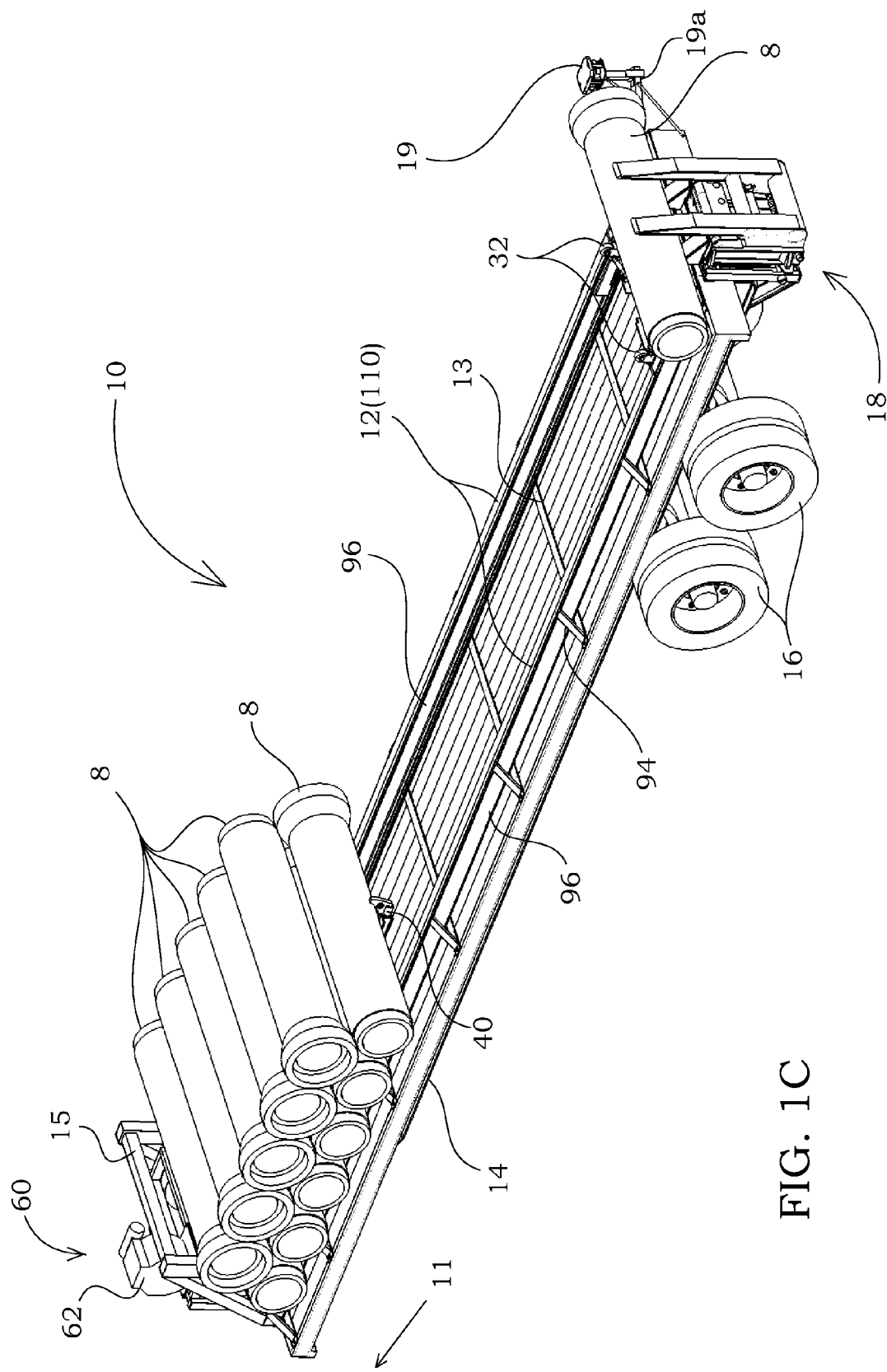
FIG. 1C provides a perspective view of a first embodiment of the trailer and/or unloading device with one object in an unload position, wherein the next object for unloading is restrained by the chock.
Figure 1D:
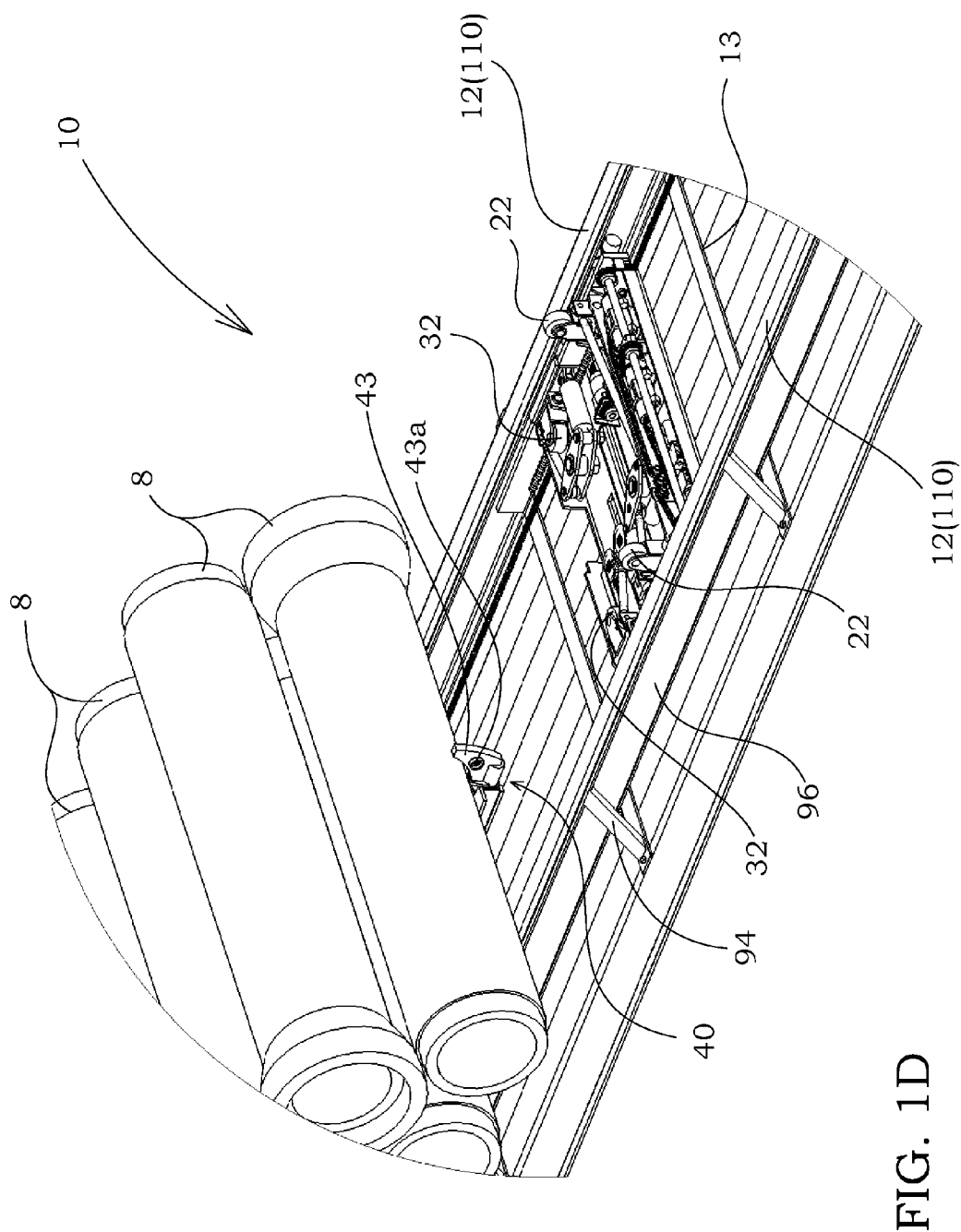
FIG. 1D provides a detailed perspective view of a first embodiment of the trailer and/or unloading device with front and rear roller assemblies in an intermediate position, wherein the front rollers are folded down and the rear rollers are up and the next object for unloading is restrained by the chock.

The control panel 70 may also be configured with a front-roller-up indicator 77, which may consist of a green light positioned on the control panel or other sort of alert. As the front rollers 32 contact a pipe section 8 still positioned adjacent other pipe sections 8 configured for transport, the hydraulic pressure within the drive mechanism for the rear roller assembly 20 will peak. This indicates that the pipe section 8 adjacent the front rollers 32 has been secured (i.e., the front rollers 32 are in physical contact with that pipe section 8). If the front rollers 32 are in the first position (i.e., folded down), and the rear rollers 22 are in the second position (as shown in FIG. 1D), peak pressure in the drive mechanism 50 associated with the rear roller assembly 20 will occur when the rear rollers 22 contact the next pipe section 8 to be unloaded (which pipe section 8 is shown engaged with the chock 40 in FIG. 1D). At this point, the operator may safely raise the front rollers 32. Accordingly, it is contemplated that the control panel 71 will include a roller-assembly-peak-pressure indicator 78b, which in conjunction with the video displays 71 assist the operator in safely unloading pipe sections 8.

The control panel 70 may also be configured with a pipe-section-position indicator (not shown), which may be configured as a light or other sensory indicator/alert. The pipe-section-position indicator will serve to alert the operator that a pipe section has reached the rear end of the I-beam rails 96 (which may be the position of the automatic stop previously described). At this point, the operator may review the video displays 71 to ensure that it is safe to allow that pipe section 8 to contact the unloader 18 and be positioned on the ground. It is contemplated that a pipe-section-position indicator may cooperate with an automatic stop to alert the operator to the fact that a pipe section 8 is adjacent the automatic stop. The pipe-section-position indicator may be configured to de-energize both electrical and hydraulic power to the roller assemblies 20, 30 when activated, such that the operator must manually reenergize power to the roller assemblies 20, 30. This configuration would ensure that a pipe section 8 would not reach the unloader 18 before the operator desired it to do so.

The trailer and/or unloading device 10 may be configured to have various safety features integrated into to the design, some of which have previously been described in detail. These safety features may be designed to protect equipment, people, the environment, or combinations thereof. One such safety feature is a main auto stop feature, the activation of which is shown by the main auto stop indicator 79. This feature may be configured to de-energize the entire trailer and/or unloading system 10 upon a given condition and/or situation. For example, if the hydraulic fluid reaches a critical temperature, the main auto stop feature may be activated to de-energize the trailer and/or unloading device. The activation of a chock auto stop feature may be shown by the chock auto stop indicator 79a. This feature may be configured to de-energize only the chock 40 upon a given condition and/or situation, in which case the feature may dictate that the chock 40 will remain in the second position until the operator rectifies the condition and/or situation. Other safety features may be incorporated into the trailer and/or unloading device 10 without departing from the spirit and scope thereof as disclosed and claimed herein.

It will be apparent to those skilled in the art that the illustrative embodiment of trailer and/or unloading device 10 as disclosed herein allows nearly full operation thereof from the cab of the prime mover 11. That is, with the control panel 70 configured as previously described, the operator may control the various elements of the trailer and/or unloading device 10 remotely. This leads to a safer, more time-efficient situation when unloading pipe sections 8, as is apparent to those skilled in the art in light of the present disclosure.

The optimal dimensions and/or configuration of the lateral supports 13, trailer frame support 14, front load stop 15, trailer wheels 16, cross bar 17, unloader 18, rear roller assembly 20, front roller assembly 30, chock 40, drive mechanism 50, hydraulic power system 60, control panel 70, anchor system 90, outriggers 94, and I-beam rails 96 will vary from one embodiment of the trailer and/or unloading device 10 to the next, and are therefore in no way limiting to the scope thereof. The various elements of the trailer and/or unloading device 10 may be formed of any material that is suitable for the application for which the trailer and/or unloading device 10 is used. Such materials include but are not limited to rubber, silicon, polymers, metals, metallic alloys, cellulosic materials, and/or combinations thereof.

2. Description of One Method of Use

Having described a preferred embodiment of the trailer and/or unloading device 10, one method of using the trailer and/or unloading device 10 will now be described. Generally, the embodiment of the trailer and/or unloading device 10 pictured herein allows an operator to robotically unload a plurality of pipe sections 8 from the trailer and/or unloading device 10. The illustrative method of use applies to pipe sections 8 having a length up to 2.5 meters and an outside diameter from 16 to 66.5 inches, and may be used for pipe sections 8 stacked in two rows (as shown in FIGS. 1A-1G, which may be used for smaller-diameter pipe sections 8), or for pipe sections 8 in a single row (which may be used for larger diameter pipe sections 8).

As shown in FIG. 1A, the chock 40 may be engaged with the rear-most pipe section 8 that is still bundled with the load, while the roller assemblies 20, 30 may simultaneously engage the pipe section 8 to be unloaded. Using the illustrative embodiment of the trailer and/or unloading device 10, the operator may simply remain in the cab of the prime mover 11 and pull the joystick 72 backward toward the side of the X that corresponds to the drive mechanism 50 for the rear roller assembly 20. During this movement, the operator may monitor the various conditions around the trailer and/or unloading device 10 via the video display(s) 71, and particularly the video display(s) 71 associated with the camera 19 viewing the area behind the trailer and/or unloading device 10 and the camera 19 viewing the trailer 10 from a rearward to forward perspective.

As the pipe section 8 approaches the unloader 18 at the rear of the trailer and/or unloading device 10, the operator may apply less pressure to the joystick 72 in the desired direction so that the speed at which the drive mechanism 50 moves the roller assemblies 20, 30 slows. It is contemplated that the drive mechanism 50 may be configured to move either the chock 40 or the roller assemblies 20, 30 at any rate up to five miles per hour. Once the pipe section 8 to be unloaded reaches the rear end of the trailer and/or unloading device 10, as shown in FIG. 1B, the operator may stop and pay special attention to the video display 71 associated with the camera 19 viewing the area immediately behind the trailer and/or unloading device 10. Additionally, the pipe-section-position indicator 79 on the control panel 70 may alert the operator that the pipe section 8 is now adjacent the unloader 18. If the trailer and/or unloading device 10 is equipped with an automatic stop, the roller assemblies 20, 30 will automatically stop when they near the unloader 18. At this point, the operator may have to press a button or perform some other affirmative action to continue unloading the pipe section 8. The operator may also use the mirrors on the prime mover 11 to ensure the unloading area is clear. This will allow the operator to ensure no objects and/or people are within the path of the pipe section 8 to be unloaded and that the unloader 18 is in the proper position to receive the pipe section 8.

After the operator has determined that it is safe to unload a pipe section 8, the operator may use the first joystick switch 72a to lower the rear rollers 22 from the second position to the first position. Lowering the rear rollers 22 allows the pipe section 8 adjacent the roller assemblies 20, to gently roll backward toward the unloader 18, as shown in FIG. 1C. However, if the angle of the trailer and/or unloading device 10 is such that the pipe section 8 does not automatically roll backwards (due to the force of gravity) at this point, the operator may continue to move the roller assemblies 20, 30 backwards with the joystick 72 until the pipe section 8 encounters the I-beam rail ramp 96a (shown in FIG. 2) or the unloader 18. The trailer and/or unloading device 10 may be configured with an external alert to notify any bystanders that a pipe section 8 will soon be placed on the ground when the pipe section 8 is in contact or nearly in contact with the unloader 18. Once the unloader 18 actuates and lowers the pipe section 8 to the ground behind the trailer and/or unloading device 10, which is shown in FIGS. 2 & 2A, the operator may move the prime move vehicle attached to the trailer and/or unloading device 10 forward by an amount approximately equal to the diameter of one pipe section 8.

The operator may use the joystick 72 to energize the drive mechanism 50 associated with the roller assemblies 20, 30 to move the roller assemblies 20, 30 forward along the I-beam rails 96 at the maximum allowable speed. Using the first joystick switch 72a, the operator may now actuate the rear rollers 22 from the first position to the second position, which may be done while the roller assemblies 20, 30 are moving forward. Using the second joystick switch 72b, the operator may actuate the front rollers 32 from the second position to the first position, as shown in FIG. 1D, which may be done while the roller assemblies 20, 30 are moving forward. The operator may pay special attention to the video display 71 associated with the camera 19 mounted toward the rear of the trailer and/or unloading device 10 and facing toward the front of the trailer and/or unloading device 10 during this process.

As the roller assemblies 20, 30 approach the next pipe section 8 to be unloaded, the operator may slow down the speed at which the roller assemblies 20, 30 traverse the I-beam rails 96. The chock camera 43a in conjunction with a video display 71 relaying the chock camera's 43a video feed allows the operator to slowly approach the pipe section 8 and minimize the impact between the rear rollers 22 and the pipe section 8. Once the rear rollers 22 are in secure contact with the next pipe section 8 to be unloaded, the system pressure in the drive mechanism 50 associated with the rear roller assembly 20 will peak, causing the roller-assembly-peak-pressure indicator 78b to alert the operator of that situation. The operator may verify this using the video display 71 as mentioned immediately above.

Figure 1E:
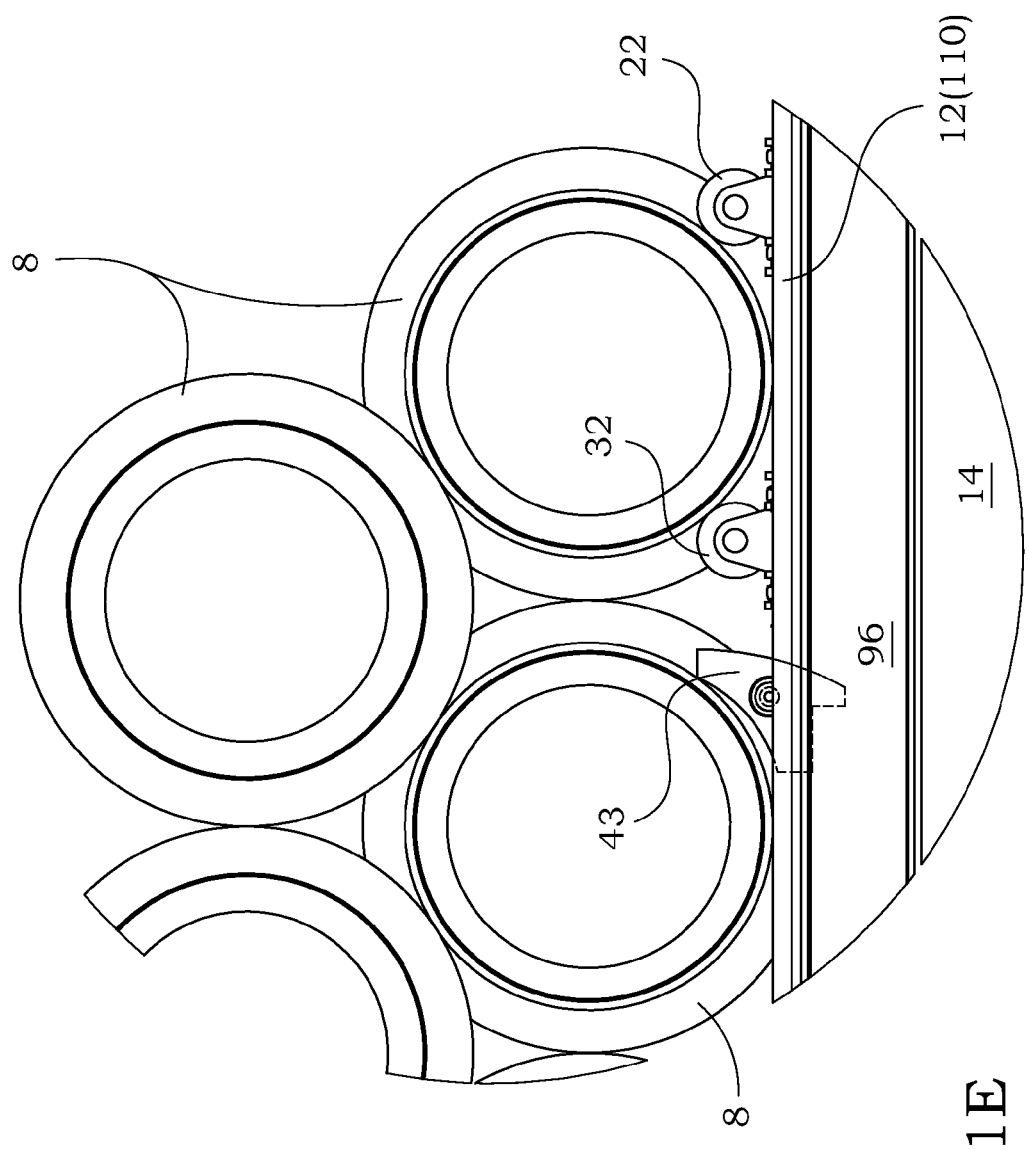
FIG. 1E provides a side view of a first embodiment of the trailer and/or unloading device with front and rear roller assemblies engaged with a first object, wherein a second adjacent object in the same row as the first object is restrained by the chock.

The operator may now raise the front rollers 32 from the first position to the second position, as shown in FIG. 1E. As previously described, the chock cantilever 44 and the respective configuration thereof with respect to the roller assemblies 20, 30 allows the front rollers 32 and stop 43 to be simultaneously positioned adjacent the same pipe section 8. Once the front rollers 32 are in the second position, the front-roller-up indicator 77 will indicate the same to the operator.

Figure 1F:
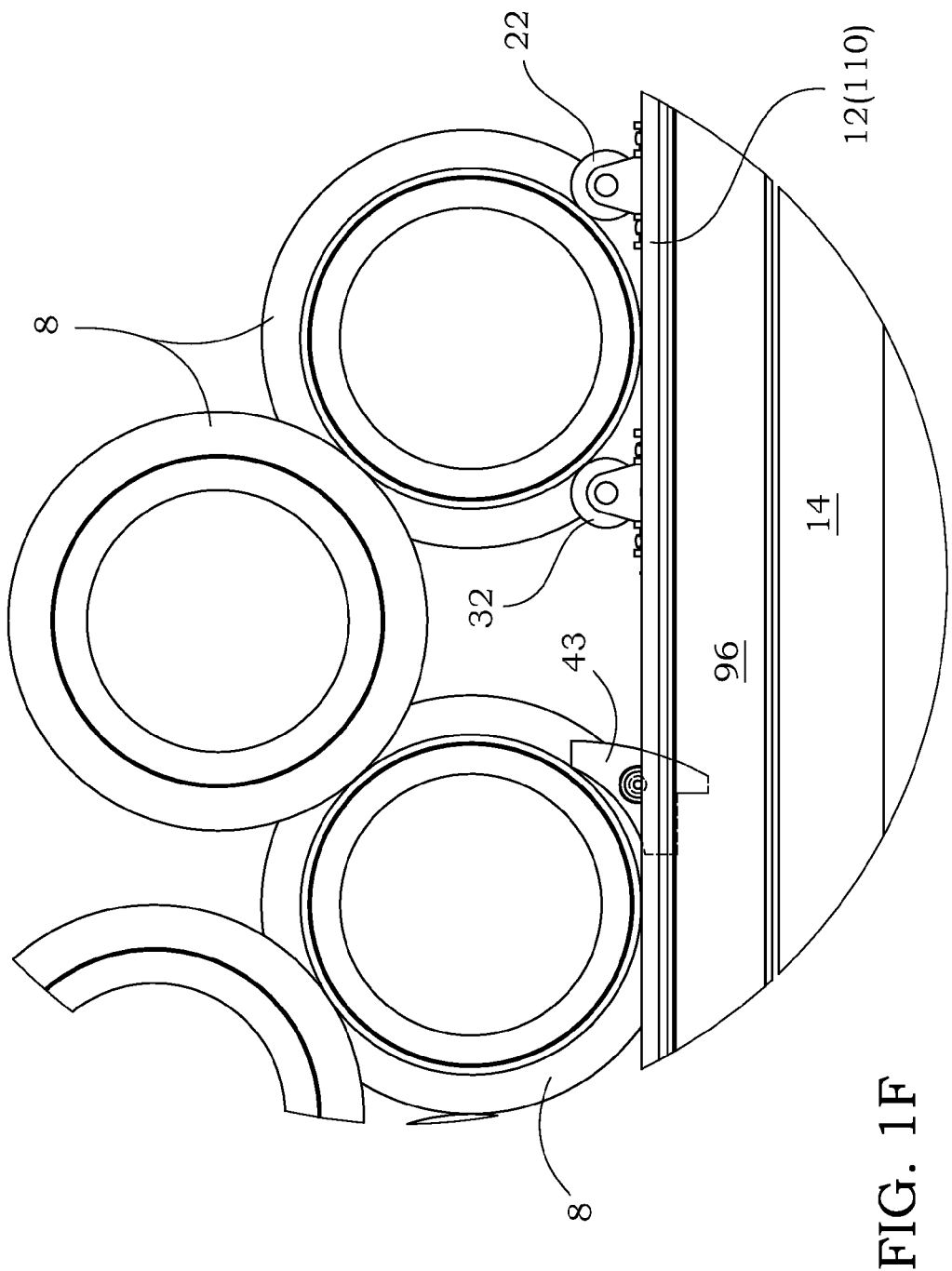
FIG. 1F provides a side view of a first embodiment of the trailer and/or unloading device with front and rear roller assemblies engaged with a first object, wherein a second adjacent object in the same row as the first object is restrained by the chock, and wherein a third adjacent object in the top row is restrained between the first and second objects.

At this point, the pipe section positioned immediately between the rollers 22, 32 is secured thereby, and the stop 43 of the chock 40 may be lowered (i.e., moved from the second position to the first position) by pressing and holding the chock-lower button 74, which would cause the chock-down indicator 76a to alert the operator that the chock 40 is in the first position and not securing any pipe sections 8. With the chock 40 in the first position and the operator holding the chock-lower button 74, the chock 40 may be moved forward to the next most-rearward pipe section 8 on the bottom row using the joystick 72, as shown in FIG. 1F.

Next, the operator may manipulate the joystick 72 in such a way as to cause the pipe section 8 between the rollers 22, 32 to very slowly move toward the rear of the trailer and/or unloading device 10. As shown in FIG. 1F, this causes the rear-most pipe section 8 on the top row to move between the pipe section 8 between the rollers 22, 32 and the pipe section 8 secured by the chock 40. This may be done in a controlled manner because the operator may adjust the speed at which the roller assemblies 20, 30 move, and because the rollers 22, 32 are pivotally attached to the roller assemblies 20, 30 so that the top pipe section 8 and pipe section 8 between the rollers 22, 32 may roll about their respective longitudinal axes. Meanwhile, the operator may observe the situation without leaving the cab of the prime mover 11 using the video display(s) 71.

After the top pipe section 8 has come into contact with the pipe rest 110 as shown in FIG. 1G, the chock 40 again may be moved. By pressing and holding the chock-lower button 74 and then manipulating the joystick 72 in the proper direction, the operator may move the chock 40 toward the rear of the trailer and/or unloading device 10. Using the video display 71, the operator will determine when the stop 43 is positioned between the two rear-most pipe sections 8 and then release the chock-lower button 74 so that the chock 40 now secures the second to rear-most pipe section.

At this point, the rear-most pipe section 8 may traverse the I-beam rails 96 to the unloader 18 and be unloaded as previously described, and the process repeated until all pipe sections 8 are unloaded. Because the roller assemblies 20, 30 cannot move forward far enough to contact the front-most pipe section 8 due to the chock 40, the anchor system 90 will cause those pipe sections 8 to migrate toward the rear of the trailer and/or unloading device 10 at a minimal rate due to the force of gravity.

Various other components and/or sensors may be incorporated into the trailer and/or unloading device 10 and/or control panel 70 thereof, without limiting the scope of the trailer and/or unloading device 10. For example, sensory alerts (such as audible alarms, lights, etc.) may be provided to assure that the front and/or rear rollers 32, 22 are properly positioned against a pipe section 8, which is also true for the chock 40.

The trailer and/or unloading device 10 disclosed herein provides multiple advantages over the prior art, which advantages include but are not limited to: (1) increased unloading speed; (2) ease of use; (3) increased safety; (4) may be retrofit to existing flatbed trailers; and, (5) ability to accommodate pipe sections 8 of widely varying sizes.

Unloading objects using the trailer and/or unloading device 10 is faster than using prior art devices at least because the operator is not required to: (1) place blocks next to pipe sections on the ground (which is done to prevent breakage); (2) remove and reposition blocks on pipe sections as they are unloaded; and, (3) the operator is not required to move between the cab of the prime mover and the trailer and/or unloading device 10.

Unloading objects using the trailer and/or unloading device 10 is easier than using prior art devices at least because the operator is not required to: (1) manually adjust the position of pipe sections 8 on the trailer and/or the unloader 18; (2)

accommodate pipe sections 8 arranged in two vertical rows; (3) move pipe sections 8 up a grade; and, (4) all operations may be completed from the cab.

Unloading objects using the trailer and/or unloading device 10 is safer than using prior art devices at least because the following hazards are eliminated: (1) pipe sections 8 rolling freely along the trailer and/or ground adjacent the trailer; (2) unblocked pipe sections 8 rolling off the trailer when the operator is near the area behind the trailer; (3) removing pipe sections 8 from a second row may be done from the cab of the prime mover; (4) operator need not manually align pipe sections 8 to the trailer; and, (5) pipe sections 8 are blocked by default because the chock defaults to a blocking position.

Additionally, unloading objects using the trailer and/or unloading device 10 disclosed herein allows the operator to arrange unloaded pipe sections 8 in a manner that was previously impossible. The operator may place the unloaded pipe sections 8 immediately adjacent one another on the ground by properly adjusting the speed of the unloader 18. This decreases the amount of space needed to unload and store pipe sections 8, as well as increasing the ease in which unloaded pipe sections 8 may be subsequently moved.

Although the specific embodiments pictured and described herein pertain to a generally cylindrical pipe section 8, the trailer and/or unloading device 10 may be configured for use with objects having different shapes and/or orientations. Accordingly, the scope of the trailer and/or unloading device 10 is in no way limited by the specific shape and/or dimensions of the object for which it is designed.

Having described the preferred embodiment, other features, advantages, and/or efficiencies of the trailer and/or unloading device 10 will undoubtedly occur to those versed in the art, as will numerous modifications and alterations of the disclosed embodiments and methods, all of which may be achieved without departing from the spirit and scope of the trailer and/or unloading device 10. It should be noted that the trailer and unloading device 10 are not limited to the specific embodiments pictured and described herein, but are intended to apply to all similar apparatuses for robotically unloading objects from a surface, and/or automating the process thereof. Modifications and alterations from the described embodiments will occur to those skilled in the art without departure from the spirit and scope of the trailer or unloading device 10.

The invention claimed is:

1. A trailer for unloading a generally cylindrical object, said trailer comprising:
    a. a frame spanning the length of said trailer, wherein said frame comprises a first and a second I-beam rail;
    b. a chock slidably engaged with said frame, wherein said chock is moveable in a first and second direction along the length of said frame, and wherein said first and second directions are located within a single plane, wherein said chock comprises a drive mechanism, wherein said drive mechanism is configured to move said chock in either said first or said second direction along the length of said frame;
    c. a stop pivotally secured to said chock, wherein said stop may be actuated between a first and second position, wherein said first position is within said single plane, and wherein said second position is above said single plane, wherein a top surface of said pair of I-beam rails is slightly above said single plane, and wherein said I-beam rails are parallel with respect to one another;
    d. a front roller assembly slideably engaged with said frame, wherein said front roller assembly is moveable in said first and second direction along the length of said frame, wherein said front roller assembly comprises two opposed front rollers, wherein said front rollers are configured to be actuated between a first and a second position, wherein said first position is within said single plane, and wherein said second position is above said single plane, and wherein said front rollers are mechanically engaged with an actuator;
    e. a rear roller assembly slideably engaged with said frame, wherein said rear roller assembly is moveable in said first and second direction along the length of said frame and moveable along the length thereof, wherein said front roller assembly is positioned between said chock and said rear roller assembly, wherein said rear roller assembly comprises a drive mechanism, wherein said drive mechanism is configured to move said rear roller assembly in either said first or said second direction along the length of said frame, wherein said rear roller assembly comprises two opposed rear rollers, wherein said rear rollers are configured to be actuated between a first and a second position, wherein said first position is within said single plane, and wherein said second position is above said single plane, and wherein said rear rollers are mechanically engaged with an actuator; and,
    f. an unloader positioned at the rear end of said frame.

2. The trailer according to claim 1 wherein said trailer is further defined as comprising a plurality of cameras, wherein said plurality of cameras are positioned to capture images of said chock, said front roller assembly, said rear roller assembly, and an area adjacent said unloader.

3. The trailer according to claim 2 wherein said drive mechanism associated with said chock is further defined as comprising:
    a. a motor;
    b. a first fixed chain spanning the length of and positioned within said first I-beam rail;
    c. a second fixed chain spanning the length of and positioned within said second I-beam rail;
    d. a jack shaft pivotally mounted to said chock; and,
    e. a roller chain communicating rotational energy from said motor to said jack shaft.

4. The trailer according to claim 3 wherein said trailer is further defined as comprising a control panel, wherein said control panel allows an operator to manipulate the position of said chock, front roller assembly, and rear roller assembly along the length of said frame, and wherein said control panel allows said operator to actuate said stop, said front rollers, and said rear rollers between said first and second positions independently of one another.

5. The trailer according to claim 4 wherein said front roller assembly and said rear roller assembly are further defined as comprising a first pair of position wheels pivotally mounted to said front roller assembly and a second pair of position wheels pivotally mounted to said rear roller assembly.

* * * * *